(12) United States Patent
Rugg et al.

(10) Patent No.: US 12,730,325 B2
(45) **Date of Patent: *Sep. 8, 2026**

(54) ATHERMALIZATION CONCEPTS FOR POLYMER EYEPIECES USED IN AUGMENTED REALITY OR MIXED REALITY DEVICES

(71) Applicant: Magic Leap, Inc., Plantation, FL (US)

(72) Inventors: Stephen Richard Rugg, Huntersville, NC (US); Ali Karbasi, Coral Gables, FL (US); Jason Donald Mareno, Raleigh, NC (US); Bach Nguyen, Coral Springs, FL (US); Philip F. Brune, Parkland, FL (US); David Tinch, Bridgeport, AL (US); Samarth Bhargava, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,299

(22) Filed: Mar. 4, 2025

(65) Prior Publication Data

US 2025/0199324 A1 Jun. 19, 2025

Related U.S. Application Data

(63) Continuation of application No. 18/549,835, filed as application No. PCT/US2022/071111 on Mar. 11, 2022, now Pat. No. 12,306,413.

(Continued)

(51) Int. Cl.

| | |
|---|---|
| ***G02B 27/01*** | (2006.01) |
| ***G02B 7/00*** | (2021.01) |

(Continued)

(52) U.S. Cl.

CPC ......... *G02B 27/0176* (2013.01); *G02B 7/008* (2013.01); *G02B 25/001* (2013.01);

(Continued)

(58) Field of Classification Search

CPC ............ G02B 27/0176; G02B 27/0172; G02B 7/008; G02B 25/001; G02B 2027/0125; G02B 2027/0178

(Continued)

(56) References Cited

U.S. PATENT DOCUMENTS

| | | | |
|---|---|---|---|
| 4,852,988 | A | 8/1989 | Velez |
| 6,433,760 | B1 | 8/2002 | Vaissie |

(Continued)

FOREIGN PATENT DOCUMENTS

| | | | |
|---|---|---|---|
| CA | 2316473 | A1 | 1/2001 |
| CA | 2362895 | A1 | 12/2002 |

(Continued)

OTHER PUBLICATIONS

European Search Report dated Jul. 29, 2024, for EP Application No. 22768237.4, twelve pages.

(Continued)

*Primary Examiner* — Tom V Sheng

(74) *Attorney, Agent, or Firm* — Zi Y. Wong; Via LLP

(57) ABSTRACT

Embodiments of this disclosure provides systems and methods for displays. In embodiments, a display system includes a frame, an eyepiece coupled to the frame, and a first adhesive bond disposed between the frame and the eyepiece. The eyepiece can include a light input region and a light output region. The first adhesive bond can be disposed along a first portion of a perimeter of the eyepiece, where the first portion of the perimeter of the eyepiece borders the light (Continued)

input region such that the first adhesive bond is configured to maintain a position of the light input region relative to the frame.

19 Claims, 21 Drawing Sheets

Related U.S. Application Data

(60) Provisional application No. 63/160,419, filed on Mar. 12, 2021.

(51) Int. Cl.
*G02B 25/00* (2006.01)
*G06F 3/01* (2006.01)

(52) U.S. Cl.
CPC .. *G02B 2027/0125* (2013.01); *G02B 27/0172* (2013.01); *G02B 2027/0178* (2013.01); *G06F 3/011* (2013.01); *G06F 3/012* (2013.01); *G06F 3/017* (2013.01)

(58) Field of Classification Search
USPC .............................................................. 345/8
See application file for complete search history.

(56) References Cited

U.S. PATENT DOCUMENTS

| | | | | |
|---|---|---|---|---|
| 6,491,391 | B1 | 12/2002 | Blum et al. | |
| 6,847,336 | B1 | 1/2005 | Lemelson | |
| 6,943,754 | B2 | 9/2005 | Aughey | |
| 6,977,776 | B2 | 12/2005 | Volkenandt et al. | |
| 7,347,551 | B2 | 3/2008 | Fergason et al. | |
| 7,488,294 | B2 | 2/2009 | Torch | |
| 8,235,529 | B1 | 8/2012 | Raffle | |
| 8,611,015 | B2 | 12/2013 | Wheeler | |
| 8,638,498 | B2 | 1/2014 | Bohn et al. | |
| 8,696,113 | B2 | 4/2014 | Lewis | |
| 8,929,589 | B2 | 1/2015 | Publicover et al. | |
| 9,010,929 | B2 | 4/2015 | Lewis | |
| 9,213,178 | B1 | 12/2015 | Giri et al. | |
| 9,274,338 | B2 | 3/2016 | Robbins et al. | |
| 9,292,973 | B2 | 3/2016 | Bar-zeev et al. | |
| 9,323,325 | B2 | 4/2016 | Perez et al. | |
| 9,720,505 | B2 | 8/2017 | Gribetz et al. | |
| 10,013,053 | B2 | 7/2018 | Cederlund et al. | |
| 10,025,379 | B2 | 7/2018 | Drake et al. | |
| 11,009,714 | B1 | 5/2021 | Robinson et al. | |
| 12,306,413 | B2 * | 5/2025 | Rugg | G06F 3/011 |
| 2003/0030597 | A1 | 2/2003 | Geist | |
| 2006/0023158 | A1 | 2/2006 | Howell et al. | |
| 2011/0211056 | A1 | 9/2011 | Publicover et al. | |
| 2011/0213664 | A1 | 9/2011 | Osterhout | |
| 2012/0021806 | A1 | 1/2012 | Maltz | |
| 2012/0200477 | A1 | 8/2012 | Fujishiro | |
| 2013/0077147 | A1 | 3/2013 | Efimov | |
| 2014/0195918 | A1 | 7/2014 | Friedlander | |
| 2015/0168731 | A1 | 6/2015 | Robbins | |
| 2015/0277125 | A1 | 10/2015 | Hirano | |
| 2018/0188528 | A1 | 7/2018 | Browy et al. | |
| 2018/0210146 | A1 | 7/2018 | Klug et al. | |
| 2019/0302461 | A1 | 10/2019 | Kanbayashi | |
| 2020/0035031 | A1 | 1/2020 | Konings et al. | |
| 2020/0150424 | A1 | 5/2020 | Browy et al. | |
| 2020/0355976 | A1 | 11/2020 | Ishii | |
| 2020/0371360 | A1 | 11/2020 | Dalrymple | |
| 2021/0011305 | A1 | 1/2021 | Chang et al. | |
| 2021/0026146 | A1 | 1/2021 | Harder et al. | |
| 2021/0208395 | A1 | 7/2021 | Hwang et al. | |
| 2022/0413302 | A1 | 12/2022 | Meitav et al. | |
| 2024/0073401 | A1 | 2/2024 | Jia et al. | |
| 2024/0168300 | A1 | 5/2024 | Rugg et al. | |
| 2024/0192481 | A1 | 6/2024 | Ong et al. | |

FOREIGN PATENT DOCUMENTS

| | | | |
|---|---|---|---|
| CA | 2388766 | A1 | 12/2003 |
| JP | 2014160112 | | 9/2014 |
| WO | 2020054377 | A1 | 3/2020 |
| WO | 2020092620 | A1 | 5/2020 |

OTHER PUBLICATIONS

European Search Report dated Oct. 22, 2024, for EP Application No. 22768237.4, eleven pages.

International Preliminary Report and Written Opinion mailed Sep. 21, 2023, for PCT Application No. PCT/US2022/071111, eight pages.

International Search Report and Written Opinion mailed Jul. 12, 2022, for PCT Application No. PCT/US2022/071111, fifteen pages.

Jacob, R. "Eye Tracking in Advanced Interface Design", Virtual Environments and Advanced Interface Design, Oxford University Press, Inc. (Jun. 1995).

Non-Final Office Action mailed Aug. 19, 2024, for U.S. Appl. No. 18/549,835, filed Sep. 8, 2023, seven pages.

Notice of Allowance mailed Jan. 29, 2025, for U.S. Appl. No. 18/549,835, filed Sep. 8, 2023, eight pages.

Rolland, J. et al., "High-resolution inset head- mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

* cited by examiner 900
905
933
933
931
901
930

800
805
833
833
801
831
831
830

ATHERMALIZATION CONCEPTS FOR POLYMER EYEPIECES USED IN AUGMENTED REALITY OR MIXED REALITY DEVICES

CROSS-REFERENCE TO RELATED APPLICATIONS

This application is a continuation of U.S. Non-Provisional application Ser. No. 18/549,835, filed on Sep. 8, 2023, which is a national stage application under 35 U.S.C. § 371 of International Application No. PCT/US2022/071111, filed internationally on Mar. 11, 2022, which claims priority to U.S. Provisional Application No. 63/160,419, filed on Mar. 12, 2021, the contents of which are both incorporated by reference herein in its entirety.

FIELD

This disclosure relates in general to systems for displaying visual information, and in particular to eyepieces for displaying visual information in an augmented reality or mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems, which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments-any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Presenting a virtual environment in a realistic manner to create an immersive experience for the user in a robust and cost effective manner can be difficult. For example, a head mounted display can include an optical system having one or more multi-layered glass eyepieces. The glass eyepiece can be an expensive and fragile component. For example, each layer may be manufactured via a complicated process that includes multiple steps to achieve the diffractive gratings and associated films to effectively project a digital image to the user. Moreover, glass can be a fragile component prone to failure or damage without careful handling of the head mounted display. Thus, there exists a need for an eyepiece that is easier to manufacture and more robust than glass eyepieces without sacrificing the quality of the digital image.

BRIEF SUMMARY

Disclosed herein are systems and methods for displays, such as for a head wearable device. An example display can include a frame, an eyepiece coupled to the frame, and a first adhesive bond disposed between the frame and the eyepiece. The eyepiece can include a light input region and a light output region. The first adhesive bond can be disposed along a first portion of a perimeter of the eyepiece, where the first portion of the perimeter of the eyepiece borders the light input region such that the first adhesive bond is configured to maintain a position of the light input region relative to the frame. Embodiments disclosed herein may provide a robust and easy to manufacture display system that can provide consistent digital image quality during use.

DETAILED DESCRIPTION

Figure 1A:
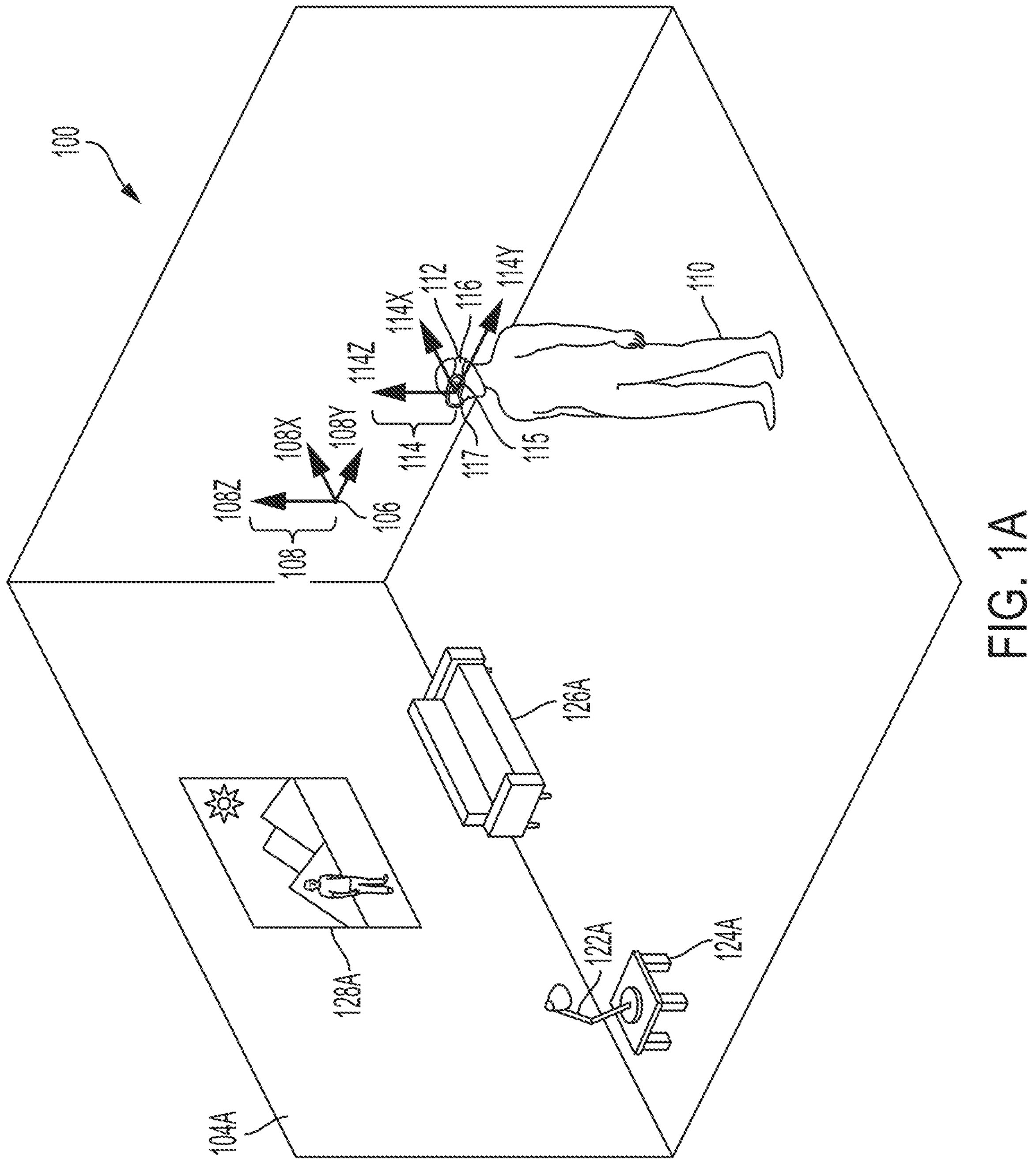
FIGS. 1A-1C illustrate an example mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell- and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment-because, as noted above, a user cannot directly perceive or interact with a virtual environment-a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
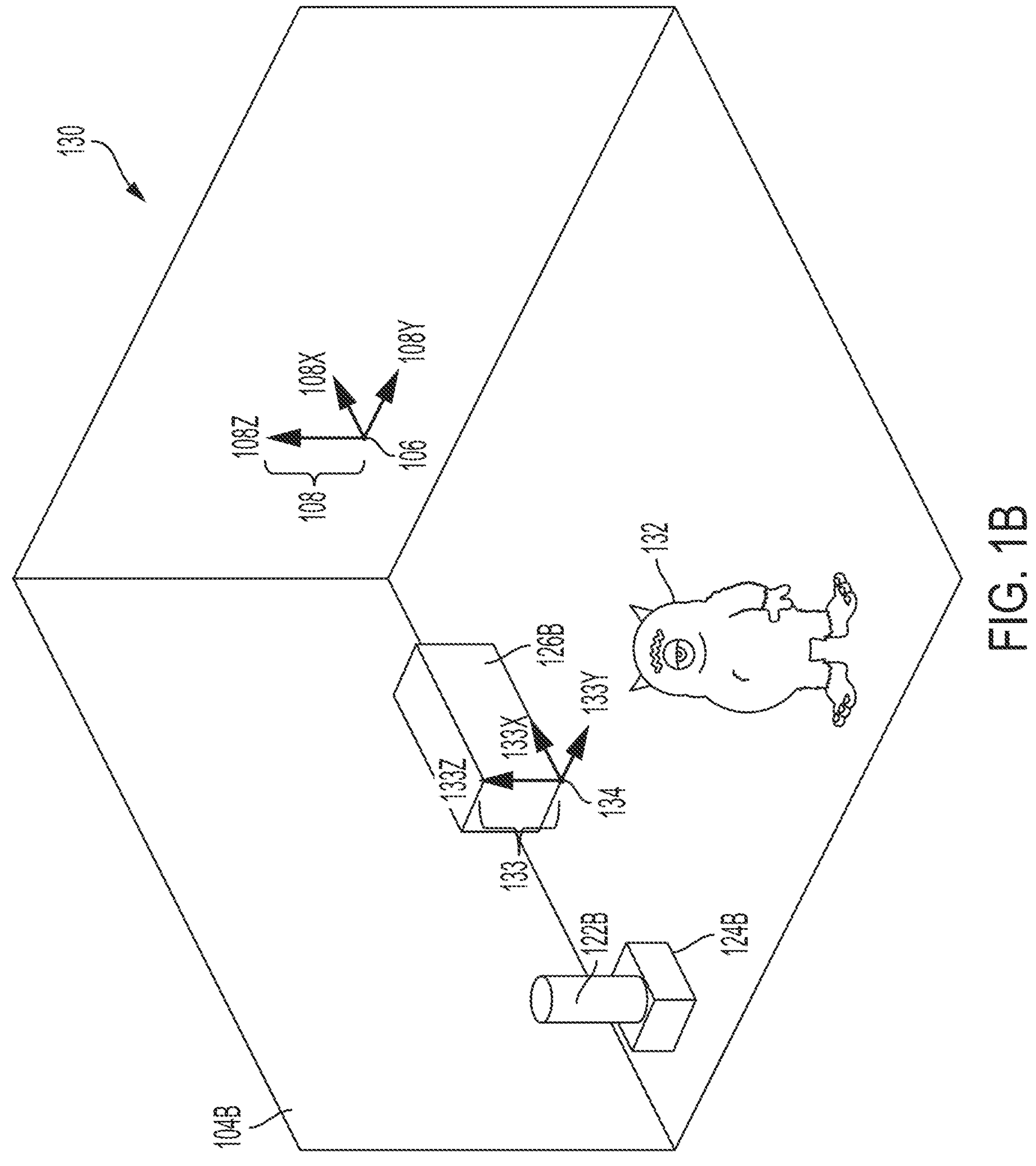

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, and 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
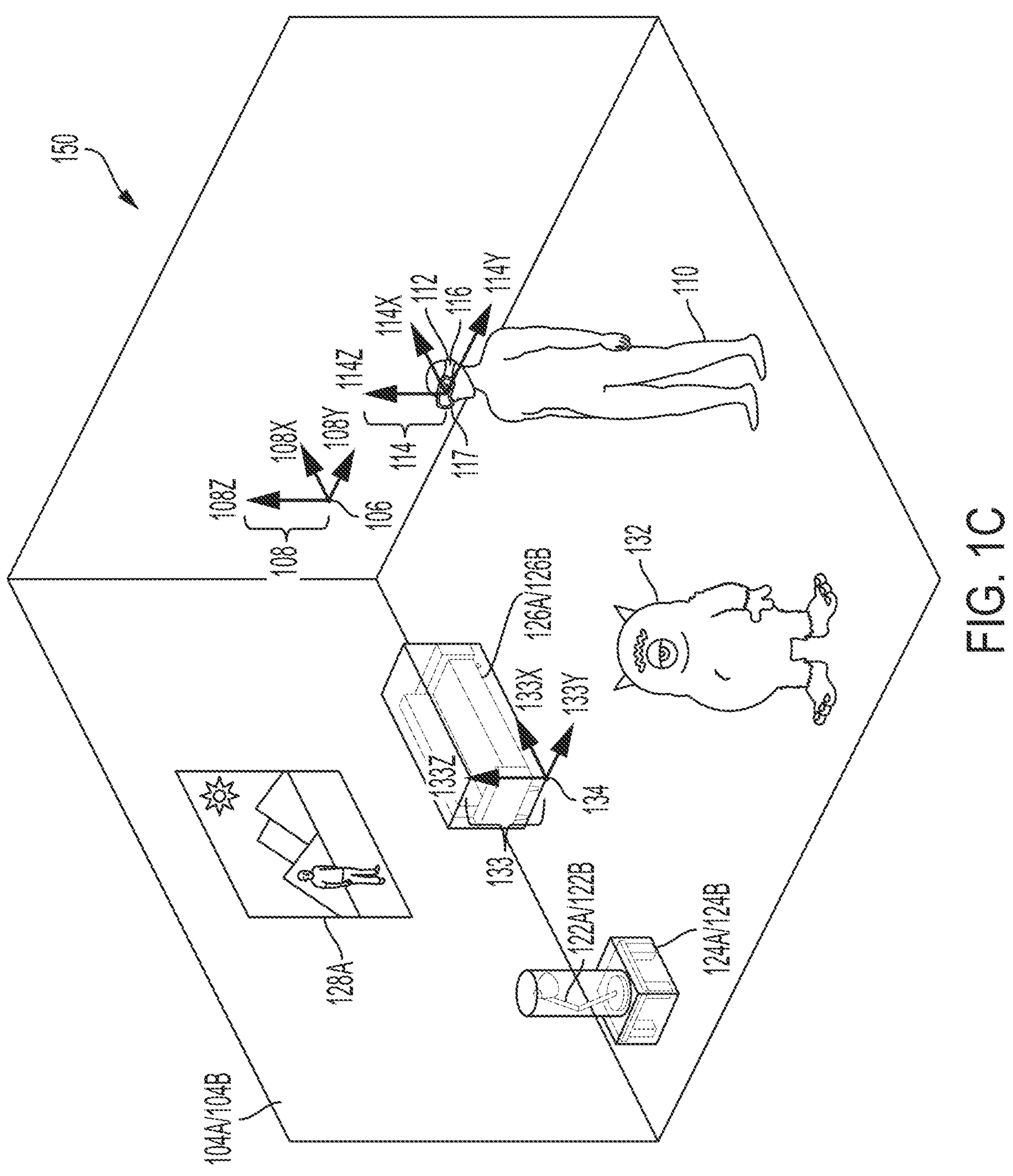

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
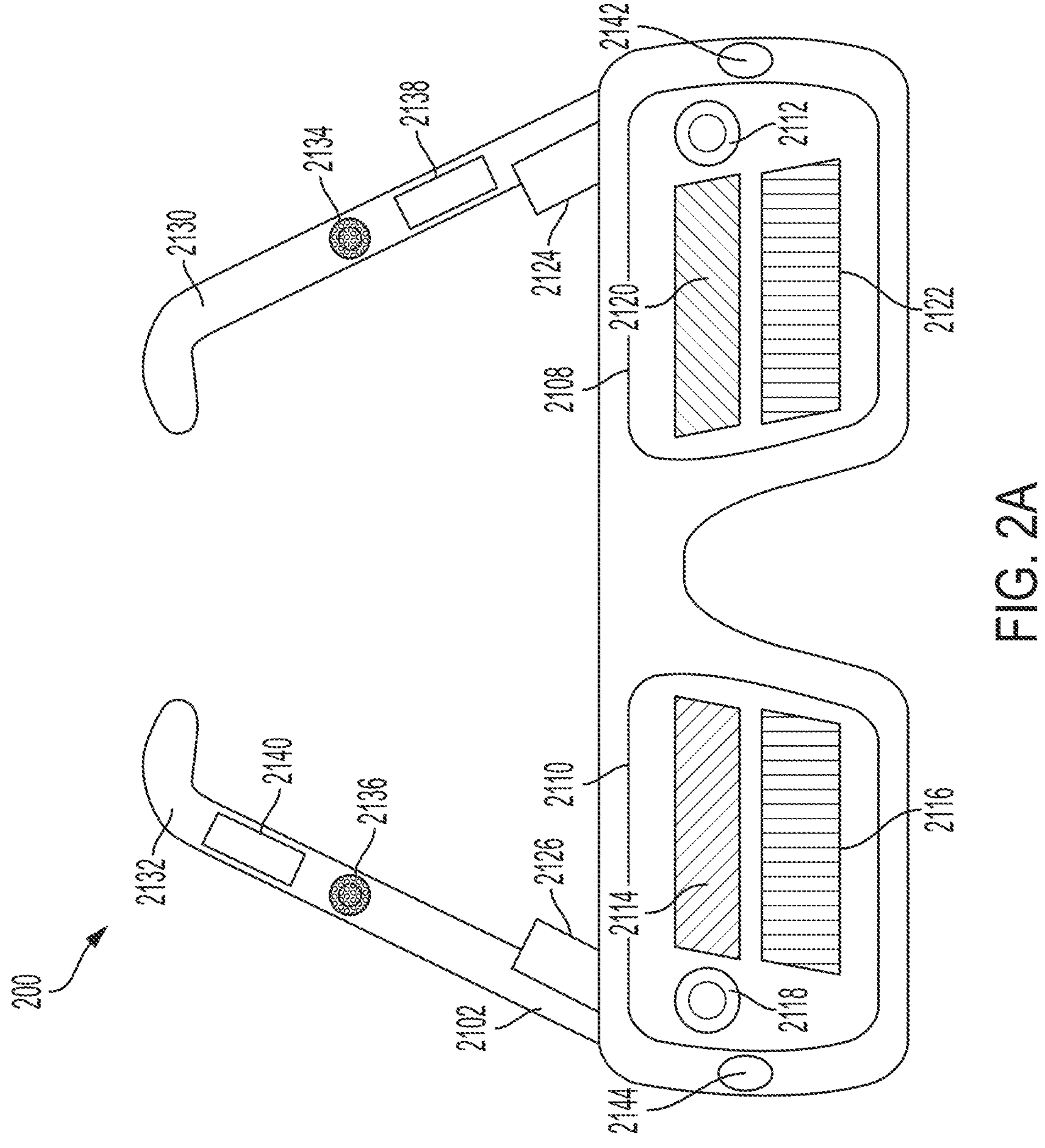
FIGS. 2A-2D illustrate components of an example mixed reality system that can be used to generate and interact with a mixed reality environment, according to one or more embodiments of the disclosure.
Figure 2B:
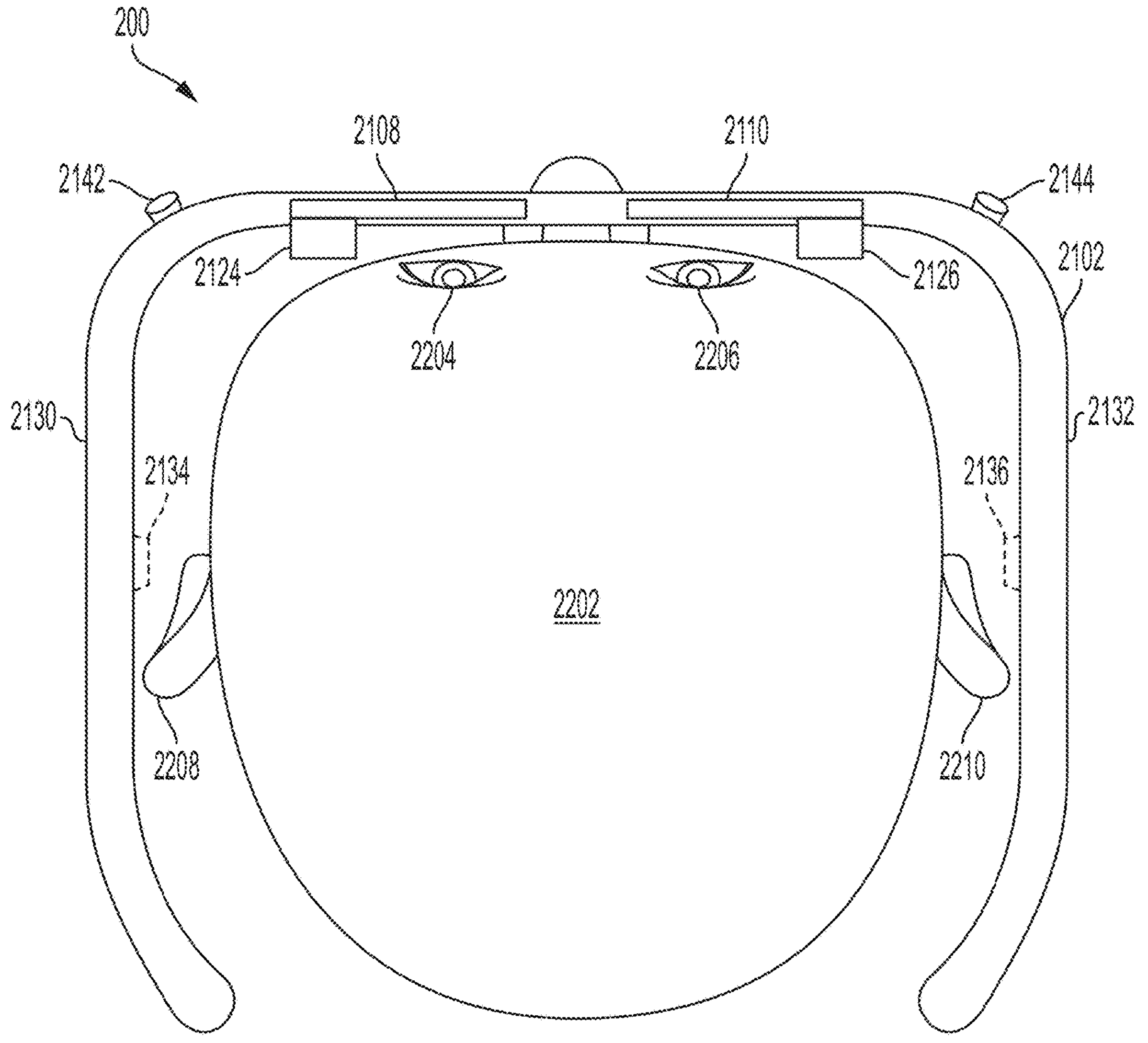
Figure 2C:
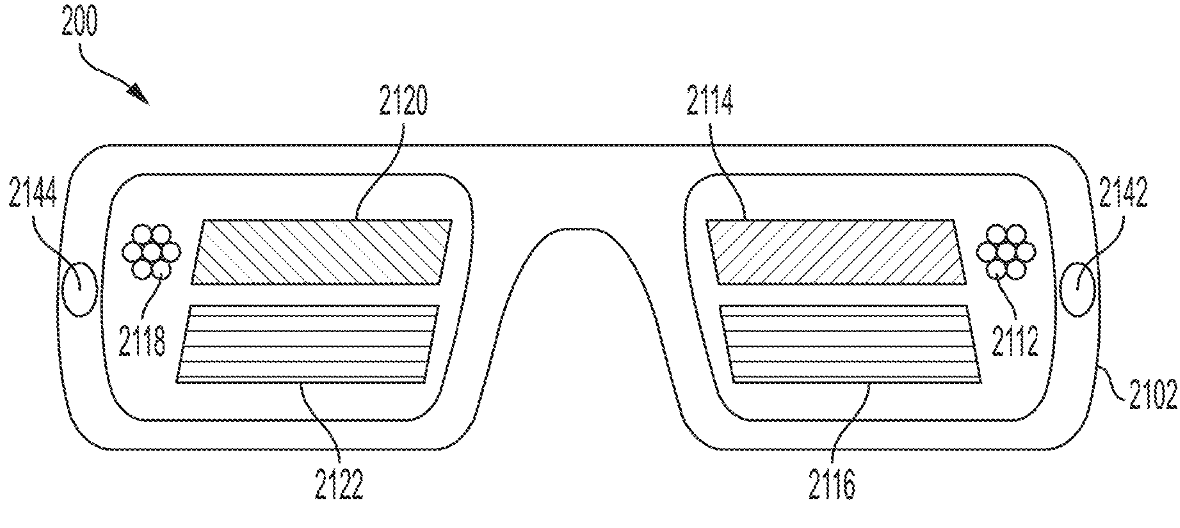
Figure 2D:
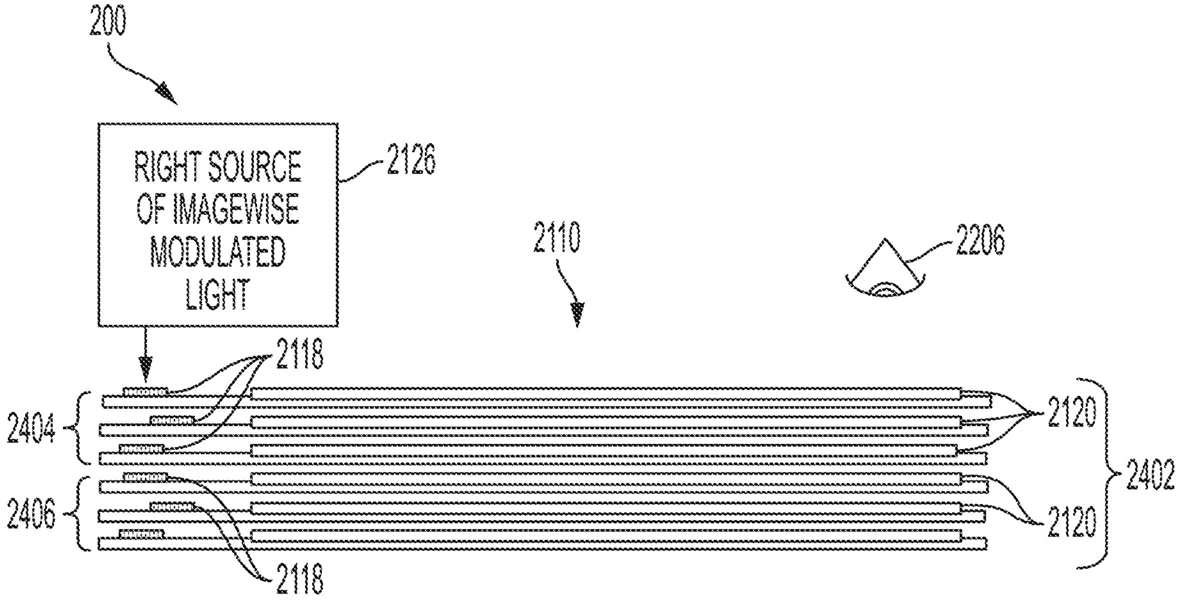

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left in-coupling grating set 2112, a left orthogonal pupil expansion (OPE) grating set 2120, and a left exit (output) pupil expansion (EPE) grating set 2122. As used herein, a pupil may refer to the exit of light from an optical element such as a grating set or reflector. Similarly, the right eyepiece 2110 can include a right in-coupling grating set 2118, a right OPE grating set 2114 and a right EPE grating set 2116. Imagewise modulated light can be transferred to a user's eye via the in-coupling gratings 2112 and 2118, OPEs 2114 and 2120, and EPE 2116 and 2122. Each in-coupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the in-coupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left in-coupling grating set 2112, and a right source of imagewise modulated light 2126 can be optically coupled into the right eyepiece 2110 through the right in-coupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the in-coupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
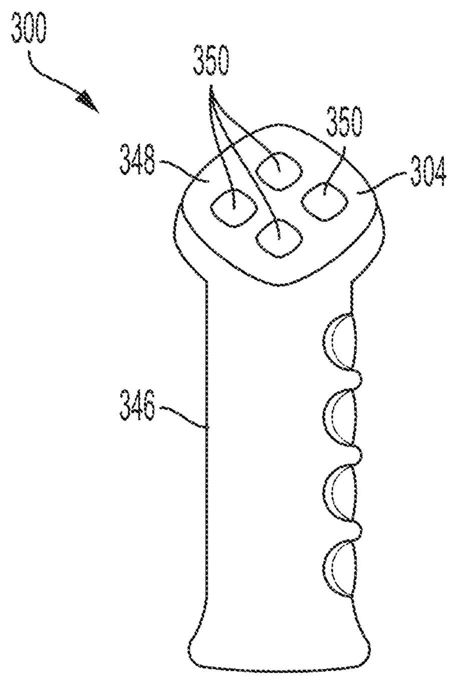
FIG. 3A illustrates an example mixed reality handheld controller that can be used to provide input to a mixed reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
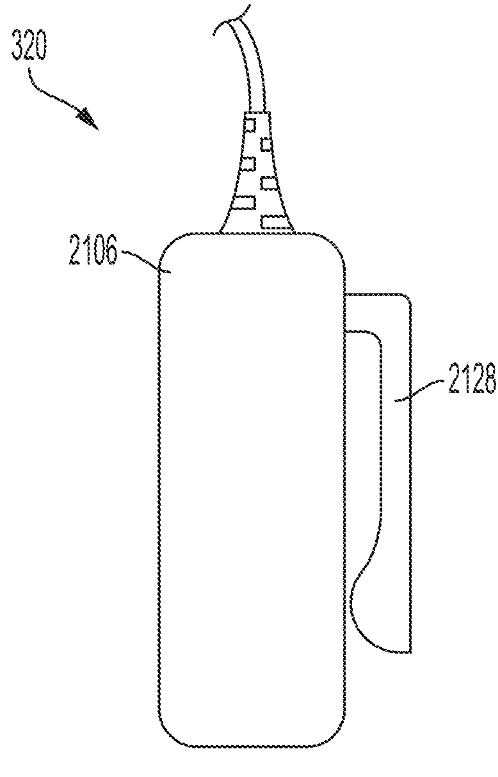
FIG. 3B illustrates an example auxiliary unit that can be used with an example mixed reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
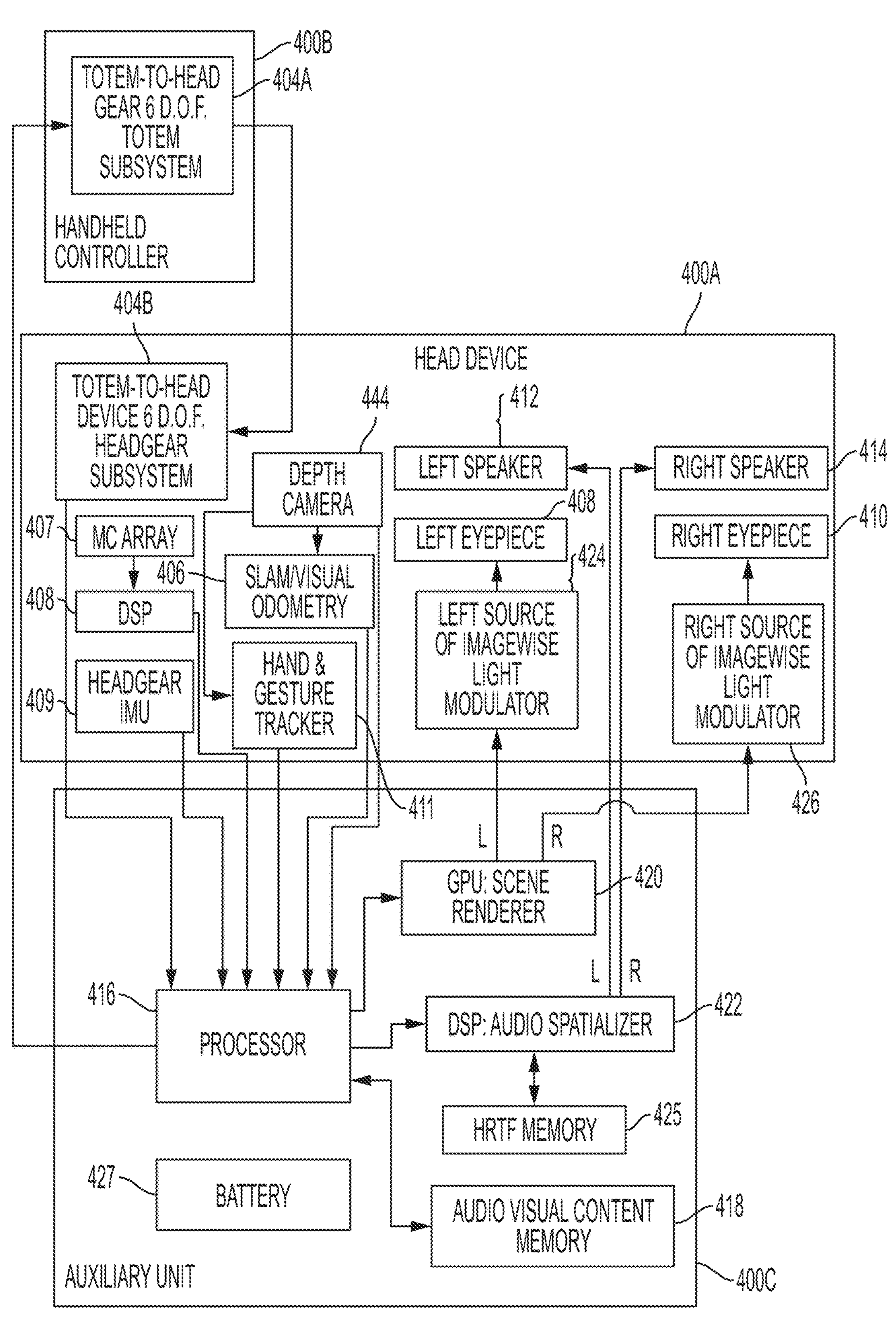
FIG. 4 illustrates an example functional block diagram for an example mixed reality system, according to one or more embodiments of the disclosure.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Example Eyepieces

Figure 6:
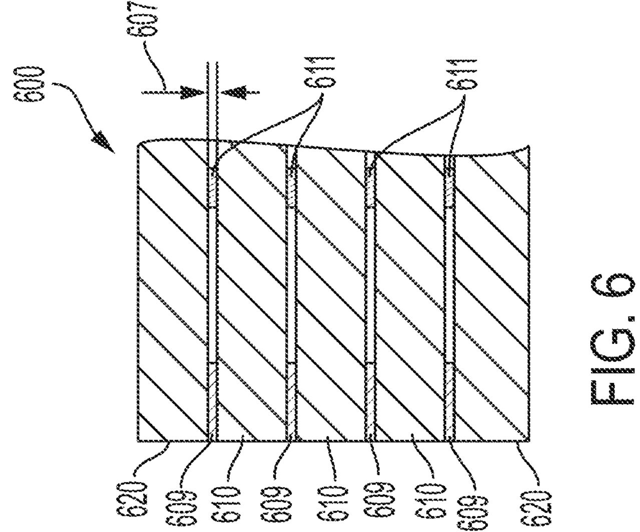
FIG. 6 illustrates an example eyepiece for an example mixed reality system, according to one or more embodiments of the disclosure.
Figure 5:
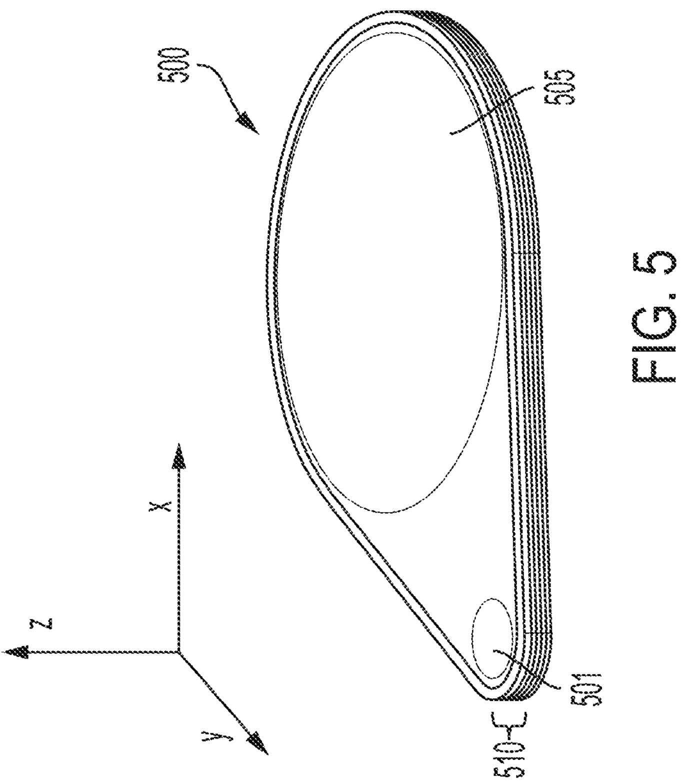
FIG. 5 illustrates an example eyepiece for an example mixed reality system, according to one or more embodiments of the disclosure.
Figure 7:
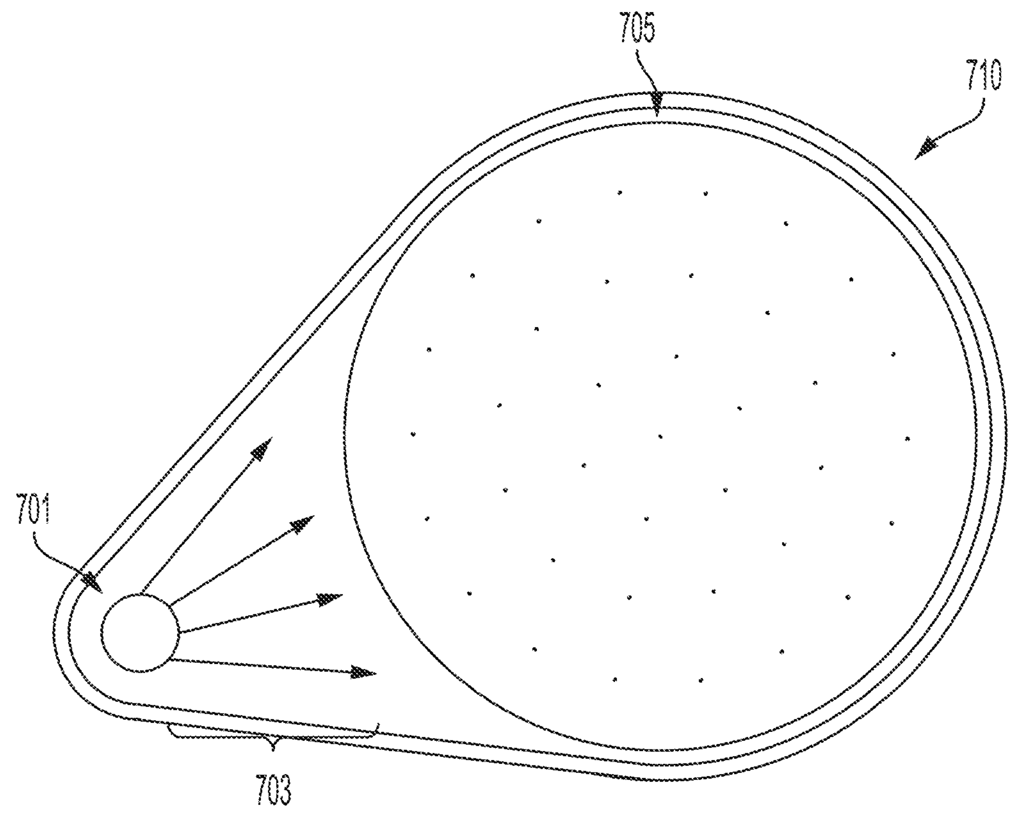
FIG. 7 illustrates an example eyepiece for an example mixed reality system, according to one or more embodiments of the disclosure.

A wearable head device or head mounted display of an example mixed reality system (e.g., mixed reality system 200) may include an optical system with an eyepiece for presenting an image to a user via the display. FIGS. 5-7 illustrate examples of an eyepiece that can be used in a wearable head device (e.g., wearable head device 2102) according to embodiments of this disclosure.

FIG. 5 illustrates an example eyepiece 500 which may be used in a wearable head device (e.g., wearable head device 2102). The eyepiece 500 can include a plurality of layers 510. The plurality of layers 510 can be arranged in parallel to form an eyepiece stack. As used herein, the term eyepiece may refer to an eyepiece stack formed from a plurality of eyepiece layers. In some embodiments, one or more of the plurality of layers of the eyepiece can include a light input region 501 and a light output region 505. The light input region 501 can refer to an area of the eyepiece 500 that receives light from a light source. The light output region 505 can refer to an area that projects light out of the eyepiece 500.

FIG. 6 illustrates an enlarged cross-sectional view of an eyepiece stack 600 having one or more layers. An eyepiece stack 600 can include a plurality of layers separated by a gap 607. In one or more embodiments, the gap may be maintained by a plurality of edge spacers 609 and pillar spacers 611 disposed between each of the layers. In some embodiments, the eyepiece stack can include one or more layers 610, 620. In some embodiments, different layers may serve different functions. For example, an eyepiece stack 600 may include one or more active layers 610 and one or more cover layers 620. As shown in the figure, eyepiece stack 600 can include three active layers 610 and two cover layers 620. The cover layers 620 can be positioned to form the outer faces of the eyepiece stack 600. For example, a first cover layer 620 may be disposed on an outer face of the eyepiece stack 600 proximate the outer environment, while a second cover layer 620 may disposed on the opposite-outer face of the eyepiece stack 600 and proximate an eye of the user when the wearable head device is in use. The active layers 610 can be positioned between the cover layers 620. In this manner, the cover layers 620 can protect the active layers 610 from damage, e.g., loads, scratches, nicks, cracks, etc.

As shown in the figure, in some examples, the eyepiece 600 may include at least three active layers 610 and two cover layers 620. The eyepiece may further include spacers disposed between each of the layers to maintain a gap 607 between the layers. The spacers may include edge spacers 609 and pillar spacers 611. The edge spacers 609 may be provided at the perimeter of the eyepiece stack 600, e.g., the edge of the eyepiece, to maintain a consistent gap between each of the layers. In some embodiments, each of the layers 610, 620 can be bonded to the edge spacers 609. These bonds may allow the eyepiece 600 to be treated and mounted as a single unit. In some embodiments, an edge spacer may be formed integrally with a layer. The pillar spacers 611 may be provided across a face of a layer to maintain a consistent gap 607 between each of the layers. Maintaining a consistent gap 607 at the perimeter and across the face of each of the layers may help ensure that light from each layer is projected in the same direction.

FIG. 7 illustrates a top view of an active layer 710 of an eyepiece (e.g., eyepiece 500). The layer 710 may include a light input region 701 and a light output region 705. The light input region 701 and the light output region 705 may correspond to the light input region 501 and light output region 505 discussed with respect to the eyepiece 500. The light input region 701 may be configured to receive light from a light source (not shown). The received light can be in-coupled into the layer 710 via the light input region 701. The in-coupled light 703 can be projected across the layer 710, toward the light output region 705. The light output region 705 can be configured to project light out of the layer 710 and eyepiece (e.g., eyepiece 500) toward the eye of a user wearing the head mounted display.

As discussed above, the eyepiece, e.g., eyepiece 500 or 600, may include a plurality of layers with one or more active layers. In some embodiments, each active layer may be configured to diffract or couple-in light of a particular wavelength into a corresponding waveguide. For example, the optical system of the head mounted display may include at least a light source (e.g., light source 2124, 2126 of FIG. 2A) configured to direct light to an eyepiece. In some embodiments, the light source may be configured to output light at one or more wavelengths and input region 701 may be tuned to one of the wavelengths. For example, input region 701 can be configured to diffract light corresponding to a wavelength output by a light source. In some embodiments, multiple active layers may be stacked together and each of the light input regions 701 may be tuned to different wavelengths corresponding to the one or more wavelengths output by the light source. In this manner, the eyepiece, e.g., eyepiece 500, can form a multi-colored digital image that can be presented to a user wearing the head mounted display.

In some embodiments, one or more of the layers of the eyepiece (e.g., eyepiece 500 or 600) may be formed from a polymer. As discussed above, glass eyepieces can be fragile and expensive. For example, glass eyepieces included in a head mounted display may be prone to damage due to regular wear and tear, e.g., dynamic forces from use, handling, and dropping, on the head mounted display. Moreover, manufacturing the glass layers may include a number of complicated manufacturing steps to achieve the diffractive gratings and associated films to in-couple and out-couple light to and from the layer. In comparison, polymer layers can be more robust and easier to manufacture than glass. For example, polymer materials are able to absorb more energy (approximately 5-8 times more) than glass prior to failure. Moreover, polymer layers can be relatively easily formed into various shapes using molds, and diffractive gratings to in-couple and out-couple light can be molded directly onto a polymer layer.

While polymer offers advantages over glass, there are also challenges with using polymers in multi-layered eyepieces for head mounted displays. For example, polymer layers may have a coefficient of thermal expansion (CTE) about ten times greater than glass. In other words, when a polymer layer experiences a change in temperature, it can expand (or contract) up to ten times as much as glass. Further, the CTE for polymers is not as consistent compared to the CTE for glass. In other words, there may be a greater variability in the CTE between different batches of the same type of polymer when compared to different batches of glass. Accordingly, layers formed from the same batch of polymers may undergo different amounts of expansion and contraction due to a change in temperature.

In practice, the relatively large CTE and variable CTE of polymers can make it difficult to manufacture a polymer eyepiece that can provide a consistent high quality digital image and maintain robustness. For example, the head mounted display may increase in temperature as the device is used and electronic components heat up. Thus, the relatively large CTE of polymers (e.g., compared to glass and metal) can introduce challenges when mounting the eyepiece, e.g., eyepiece 500, to a material with a lower CTE. In some embodiments, the eyepiece may be mounted to a head mounted display via a frame. In some embodiments, the entire perimeter of the eyepiece may be mounted to the frame. The frame may be formed from a stiff material such as metals, e.g., magnesium, which have a relatively low CTE compared to polymers. Due to this difference between CTEs of metal and polymer, as the head mounted display undergoes a change in temperature, a polymer eyepiece may expand more than the metal frame. Relative expansion of the polymer eyepiece to the metal frame may result in eyepiece deformation that can decrease the performance and quality of the digital image presented to the user.

Additionally, the variable CTE of polymers, e.g., between batches of polymers, can make it challenging to maintain the quality of the digital image presented to the user. For example, the quality of the digital image may depend on maintaining a consistent distance or gap between the layers and alignment, e.g., top-down, of the layers within the stack. Variation in the CTE between the layers may affect the gap and alignment of the layers. For example, as the eyepieces heat up, differences in the CTE may cause some layers to expand (lengthwise and widthwise) more than others. Expansion lengthwise, e.g., in-plane, may impact the alignment of the layers, particularly alignment of the light input region 701 and light output region 705, while expansion widthwise, e.g., out-of-plane, may impact the gap size.

Eyepieces in accordance with this disclosure may provide mounting athermalization between the eyepiece, e.g., eyepiece 500 and/or 600, and the frame as well as between layers of the eyepiece. As used in this disclosure, an athermalization may refer to processes and or structures used to improve the optical stability (e.g., quality of a displayed image) of an eyepiece and/or display with fluctuations in temperature. An athermalized eyepiece may reduce the impact of the relatively large CTE and variable CTE of polymer in eyepieces used in head mounted displays.

Example Athermalized Mounting

As discussed above, without utilizing athermalization techniques, a polymer eyepiece mounted to a metal frame may experience performance degradations as the head mounted display undergoes changes in operational temperatures and loads. For example, head mounted displays may include one or more polymer eyepieces, e.g., eyepiece 500, mounted to a metal frame. Mounting an eyepiece to a frame may aid in securing the eyepiece to the head mounted display and align the eyepiece with other components of the optical system, e.g., the light source, in order to deliver a digital image to the user. During operation the head mounted display, including the polymer eyepiece, may heat up. As a result, the polymer eyepiece may expand in all directions, for example, in-plane expansion in the x and y directions, and out-of-plane in the z-direction. The amount of expansion may correspond to a total span of the polymer material in a given direction. Thus, the eyepiece may have the most expansion in-plane, where there is a longer span of polymer material, and the least expansion in the z-direction.

As discussed above, the perimeter of the eyepiece may be mounted via an adhesive to a metal frame in a head mounted display. Due to the difference in CTEs between metal and polymer and the dimensions of the components, when the head mounted display undergoes a change in temperature the polymer eyepiece may expand a greater amount than the metal frame. As a result, the polymer eyepiece may be constrained by the adhesive. The constraints imposed by mounting the polymer eyepiece to the metal frame may result in eyepiece deformation that can decrease the performance and quality of the digital image presented to the user. For example, deformation can cause misalignment between layers of the eyepiece and/or between the eyepiece and the light source, and affect the gap consistency.

A mounting scheme to promote athermalization between the frame and polymer eyepiece according to embodiments of this disclosure can securely hold the eyepiece in place while permitting the polymer eyepiece to expand and/or contract relative to the metal frame without diminishing the quality of the output digital image. Embodiments in accordance with this disclosure may provide a polymer eyepiece, e.g., eyepiece 500, mounted to a metal frame using one or more adhesives along a perimeter of the polymer eyepiece. The one or more adhesives and/or the frame may secure the polymer eyepiece, e.g., eyepiece 500, to the frame while permitting the eyepiece to expand and/or contract.

Figures 8, 9:
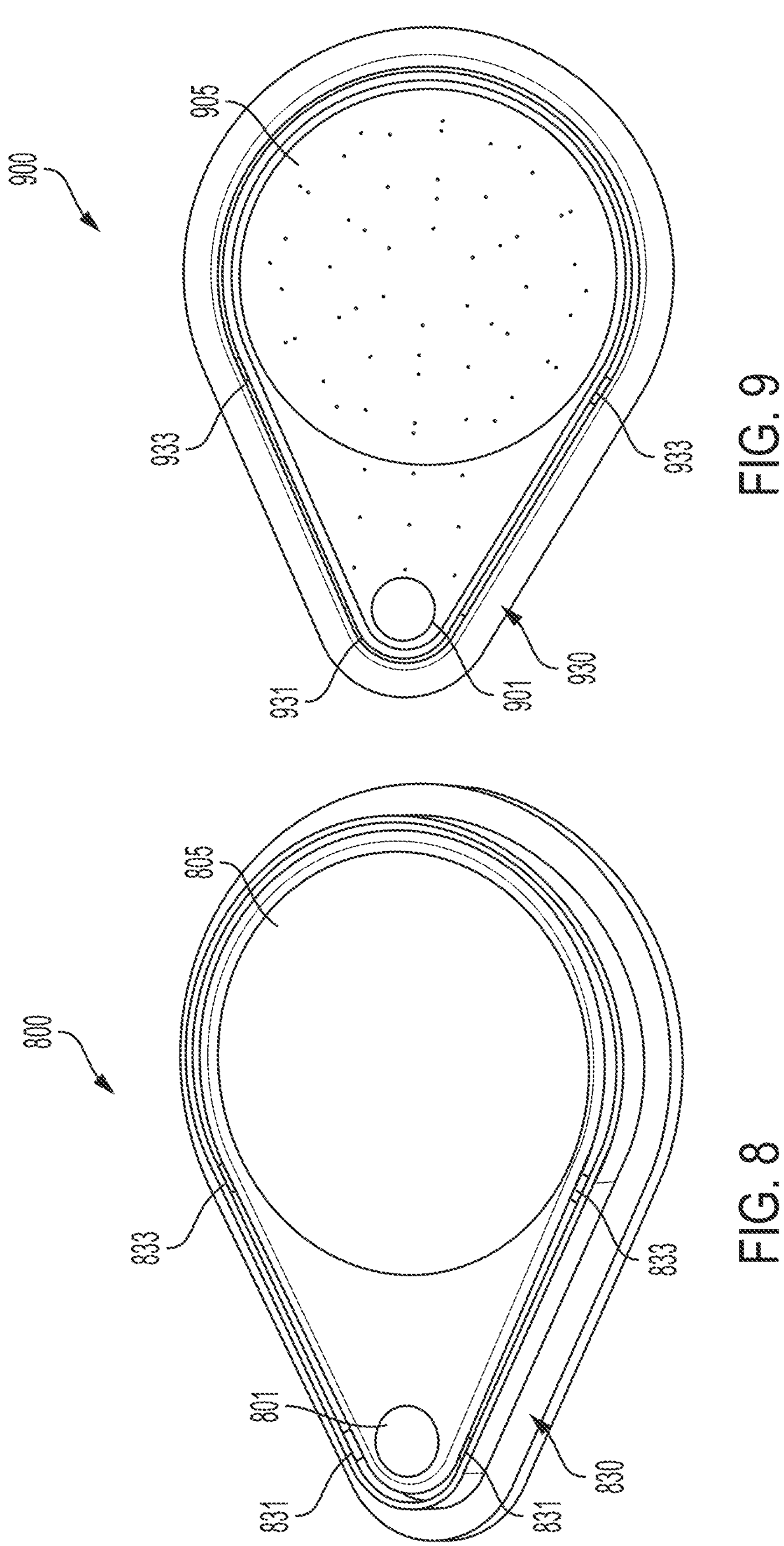
FIG. 8 illustrates an example eyepiece and mounting scheme for an example mixed reality system, according to one or more embodiments of the disclosure.
FIG. 9 illustrates an example eyepiece and mounting scheme for an example mixed reality system, according to one or more embodiments of the disclosure.

FIG. 8 illustrates an optical system for a mixed reality system including an eyepiece 800 mounted in a frame 830 according to embodiments of this disclosure. As shown in the figure, an eyepiece 800, e.g., a polymer eyepiece, may be disposed in a metal frame 830. The polymer eyepiece 800 may be bonded to the frame 830 using at least two sets of bonds. The first set of bonds 831 may be formed from an adhesive having a first stiffness, while the second set of bonds may be formed from an adhesive having a second relatively flexible stiffness compared to the first set of bonds. For example, if the first set of bonds have a stiffness of about 1000 MPa, the second set of bonds may have a stiffness of about 100 MPa. The adhesives may include, for example, Dymax (E=730 MPa) and Epotek (E=2300 MPa). In some embodiments, the stiffness of the adhesives can be tuned to achieve the desired performance.

In some embodiments, the first set of bonds 831 may be located near the light input region 801 of the eyepiece 800. For example, the first set of bonds 831 may include at least two bond segments located on opposite sides of the light input region 801 along the perimeter of the eyepiece 800. The bond segments may be relatively short in length compared to the size of the eyepiece 800 and the light input region 801. For example, the bond segment may be less than half of the length of the light input region. While the bond segments are shown as the same length in some embodiments, the bond segments may have different lengths. The first set of bonds may 831 be formed from a relatively stiff or hard adhesive. Placing the first set of bonds 831 with relatively stiff bonds near the light input region 801 may constrain the eyepiece near the light input region 801. In this manner, the first set of bonds may be used to maintain alignment between the light input region 801 and a light source (not shown) throughout temperature fluctuations of the head mounted display. Maintaining alignment between the light source and the light input region may ensure that the eyepiece 800 can properly in-couple light into the eyepiece 800 from the light-source.

The second set of bonds 833 may include at least two bond segments located near the light output region 805 along the perimeter of the eyepiece. The bond segments may be relatively short in length compared to the size of the eyepiece 800 and the light output region 805. In some embodiments, the bond segments of the second set of bonds 833 may be (but is not limited to) the same length as the first set of bonds 831. The second set of bonds 833 may be located on opposite sides of the eyepiece 800 and/or light output region 805, near the area where input light, e.g., light 703, is projected across the eyepiece 800. In some embodiments, the second set of soft bonds may include a single soft bond. In some embodiments, the eyepiece 800 can be mounted to the frame 830 without the second set of bonds, i.e., the eyepiece is mounted to the frame with the first set of bonds 831.

The second set of bonds 833 may be formed from a relatively compliant or soft adhesive compared to the first set of bonds 831. For example, the second set of bonds 833 may permit movement of the eyepiece 800 due to in-plane expansion and/or contraction. In comparison, the first set of bonds 831 may restrict movement of the eyepiece 800 due to in-plane expansion and/or contraction. The second set of bonds 833 may provide additional strength and stability to the eyepiece mounting, while minimizing resistance between the eyepiece and adhesive as the eyepiece expands and/or contracts in-plane.

FIG. 9 illustrates an optical system including an eyepiece 900 mounted in a frame 930 according to embodiments of this disclosure. As shown in the figure, an eyepiece 900, e.g., a polymer eyepiece, may be disposed in a metal frame 930. The polymer eyepiece 900 may be bonded to the frame 930 using at least two types of bonds-a first, hard bond 931 can be formed from an adhesive having a first stiffness, and a second set of soft bonds 933 may be formed from an adhesive having a second relatively flexible stiffness compared to the first, hard bond 931. The hard bond 931 may be located near the light input region 901. Compared to the first set of bonds 831 illustrated in FIG. 8, the hard bond 931 may be located along a greater length of the perimeter of the eyepiece 900 near the light input region 901. For example, hard bond 931 may form an arc along a perimeter of the eyepiece 900. This additional length of adhesive may provide greater bond strength between the eyepiece 900 and the frame 930 compared to the mounting configuration of eyepiece 800. The soft bonds 933 may be similar to the second set of bonds 833 described above.

While FIGS. 8 and 9 are illustrated with a particular configuration of the first and second set of bonds, a skilled artisan will understand that multiple configurations of the first and second set of bonds can be implemented without departing from the scope of this disclosure. For example, in some embodiments the first set of hard bonds may be disposed in a different locations along the perimeter of the eyepiece, for example, based on the shape and/or location of the light input and output regions.

Figure 10:
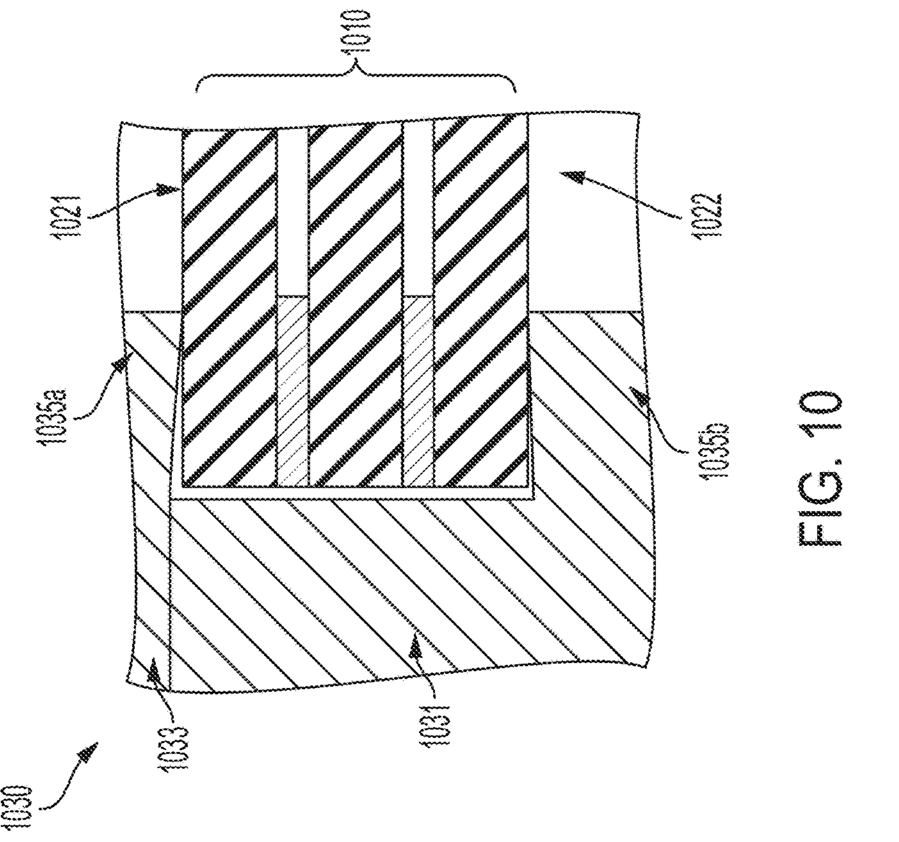
FIG. 10 illustrates an example eyepiece and mounting scheme for an example mixed reality system, according to one or more embodiments of the disclosure.

FIG. 10 illustrates an example eyepiece 1000 for a mixed reality system mounted in a frame 1030 in accordance with embodiments of the present disclosure. As shown in the figure, the frame can include one or more lips 1035*a*, 1035*b* that are configured to engage with the eyepiece 1000 to prevent out of plane deformation and potential damage. The eyepiece 1000 may include one or more layers 1010. The one or more layers may include active layers and/or cover layers. The frame 1030 may include a primary frame member 1031 having a lip 1035*b*. The frame 1030 may also include a cap 1033 having a lip 1035*a*. The cap 1033 may be disposed on the primary frame member 1031 to form a gap between the lip 1035*a* and the lip 1035*b*. As shown in FIG. 10, the lip 1035*a* may be an upper lip, while the lip 1035*b* may be a lower lip. A skilled artisan will understand that the upper/lower designations are not intended to limit the scope of the disclosure.

The eyepiece 1000 may be disposed in the frame 1030 such that the upper lip 1035*a* may contact the top surface 1021 of the eyepiece 1000. The lower lip 1035*b* may contact the bottom surface 1022 of the eyepiece 1000. In this manner, the upper lip 1035*a* and the lower lip 1035*b* may secure the eyepiece 1000 with light contact between the eyepiece 1000 and the lips 1035*a*, 1035*b*. This light contact may permit the eyepiece 1000 to expand in the frame without deformation. In other words, the gap formed between the upper and lower 1035*a*, 1035*b* lips may be toleranced to bound the perimeter of the eyepiece 1000 and hold the eyepiece 1000 in the frame 1030, while still permitting the eyepiece to expand and contract with changes in temperature.

In some embodiments a frame including a frame member 1031 and a cap 1033 may be used with the adhesive bonds described above with respect to FIGS. 8 and 9. In some embodiments, the lips 1035*a*, 1035*b* may be angled slightly with respect to the eyepiece 1000, such that the gap between the lips and the eyepiece (e.g., lip 1035*a* and the top surface 1021 the eyepiece 1000) is smaller at a distal end of the lips. In some embodiments, the cap 1033 may be located along the entire perimeter of the frame member 1031. In some embodiments, the cap 1039 may be intermittently located along segments of the perimeter of the frame member 1031. For example, the location of the cap may be located in areas without adhesive bonds (e.g., first bond segments 831 and second bond segments 833).

Figure 11:
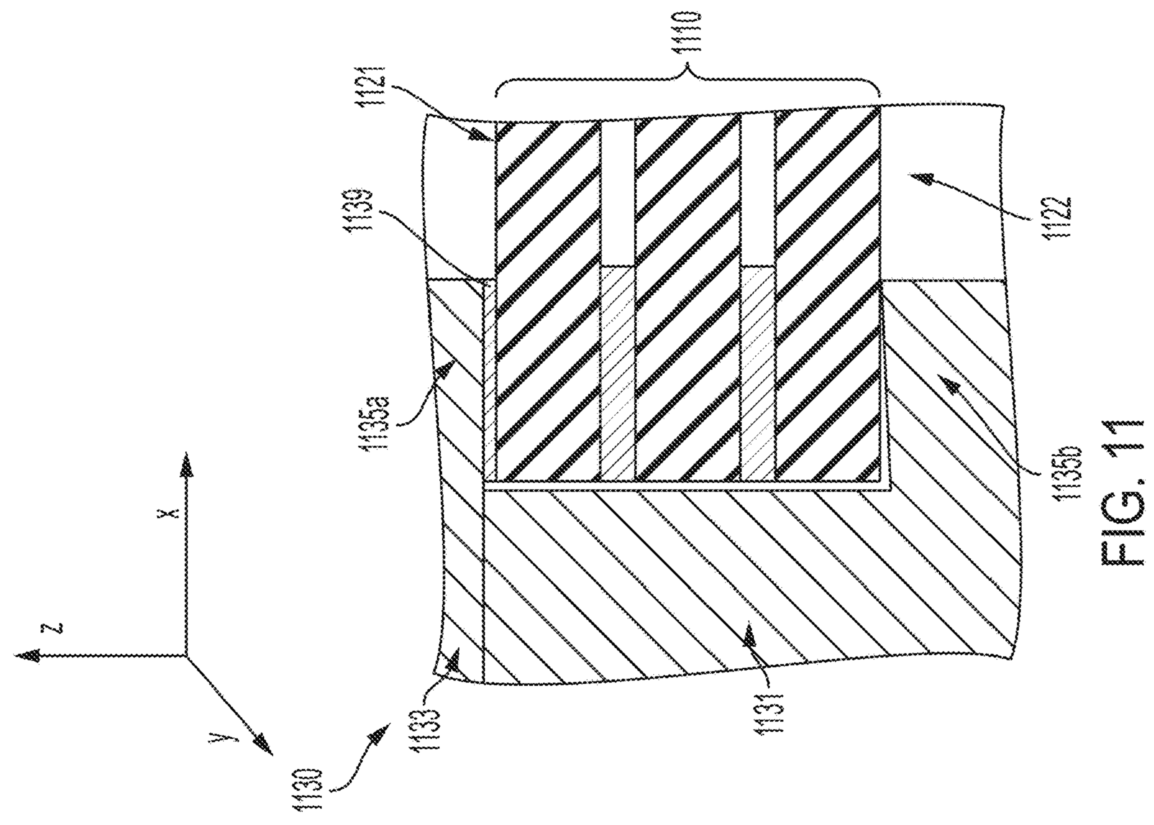
FIG. 11 illustrates an example eyepiece and mounting scheme for an example mixed reality system, according to one or more embodiments of the disclosure.

FIG. 11 illustrates an example eyepiece 1100 for a mixed reality device mounted in a frame 1130 in accordance with embodiments of the present disclosure. As shown in the figure, the frame 1130 can include one or more lips 1135 that are configured to engage with the eyepiece 1100 to prevent out of plane deformation as described with respect to eyepiece 1000. For example, the frame 1130 may include a primary frame member 1131 and a cap 1133 as described above with respect to frame 1030. The frame 1130 may further include a layer of foam 1139 located on a lower surface of the cap 1133. The layer of foam 1139 may be located such that it lightly contacts the top surface 1121 of the eyepiece 1100 when the eyepiece 1100 is positioned in frame 1130, i.e., in the gap between the upper lip 1135*a* and the lower lip 1135*b*. As the eyepiece 1100 expands and contracts in the frame, the eyepiece 1100 may compress the foam 1039. In this manner, the foam 1139 may permit expansion of the eyepiece with minimal resistance, while still applying a contact force to the eyepiece 1100 to hold it place when there is no expansion. Compared to frame 1030, the frame 1130 may permit a wider range of tolerances of the cap 1133 and the frame member 1131 due to the presence of the layer of foam 1139.

Figure 12:
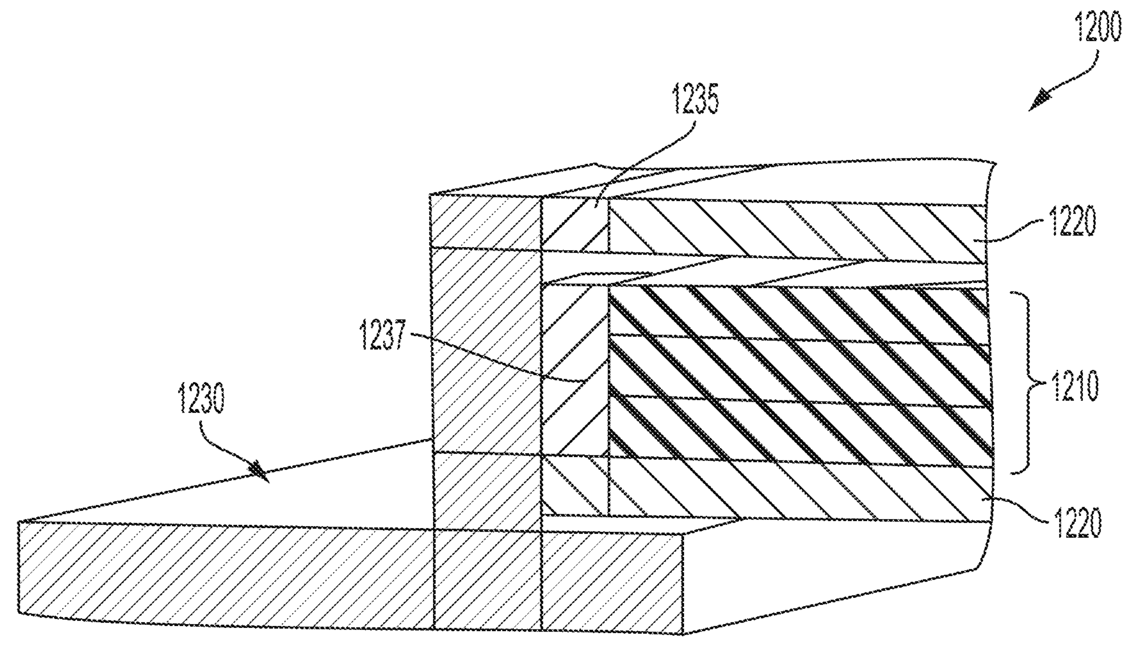
FIG. 12 illustrates an example eyepiece and mounting scheme for an example mixed reality system, according to one or more embodiments of the disclosure.

FIG. 12 illustrates an example eyepiece 1200 mounted in a frame 1230 in accordance with embodiments of the present disclosure. As shown in the figure, the eyepiece 1200 may include two glass cover layers 1220 that can sandwich one or more polymer active layers 1210. This eyepiece configuration will be discussed in greater detail in the layer-to-layer athermalization section. Due to the CTE differences between glass and polymer, the active layers 1210 and the glass cover layers 1220 may be mounted separately to the frame 1230. This may permit the polymer layers 1210 to expand and contract at a different rate from the glass cover layers 1220 without impacting the bonds between the frame 1230 and the cover layers 1220. For example, the glass cover layers 1220 may be mounted to the frame 1230 with bonds 1235, while the polymer active layers 1210 may be mounted to the frame 1230 with bonds 1237.

As shown in the figure, the polymer active layers 1210 may be mounted to the frame 1230 together, e.g., as a unit, where the bond 1237 can be used to mount the one or more active layers 1210. The active layers 1210 may be mounted to the frame as described in FIGS. 8 and 9. For example, the active layers 1210 may be mounted to the frame 1230 using at least a set of hard bonds, e.g., hard bonds 831. In some embodiments, the active layers 1210 may be mounted using a set of hard bonds and set of soft bonds, e.g., soft bonds 833.

The glass cover layers 1220 may be mounted to the frame 1230 using bonds 1235. As shown in the figure, the cover layers 1220 may be mounted separately on opposite sides of the active layers 1210. In some embodiments, the entire perimeter of one or more of the glass cover layers 1220 can be bonded to the frame 1230. In other words, the bond 1235 may be located continuously along the perimeter of the glass cover layers 1220. In some embodiments, the bond 1235 may be located along portions of the perimeter of the glass cover layers 1220 such that the bond 1235 spans discrete segments of the perimeter.

While the above examples are described with respect to specific figures, a skilled artisan will understand that an eyepiece to frame mounting scheme according to embodiments of this disclosure may include embodiments from one or more of the figures above. For example, an optical system with a mounting scheme as described with respect to FIGS. 8 and 9, e.g., where at least one set of hard bonds 831 is used to mount the eyepiece 800 to the frame 830, may also include a frame having a cap, e.g., cap 1033, cap 1133, to constrain out of plane movement of the eyepiece.

Example Layer-to-Layer Athermalization

Figure 13A:
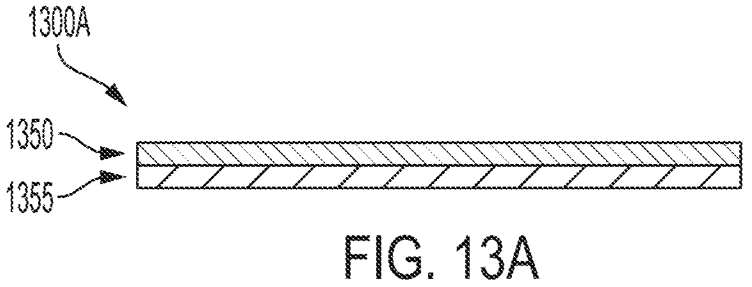
FIGS. 13A-13C illustrate examples of the bi-metallic phenomenon.
Figure 13B:
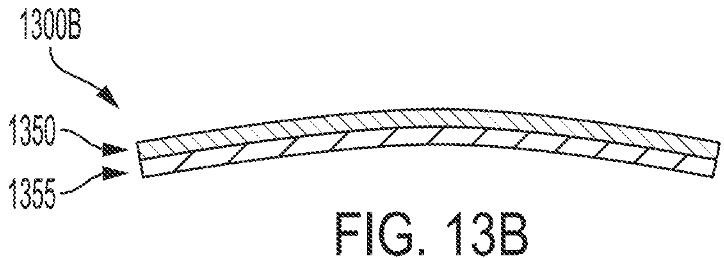
Figure 13C:
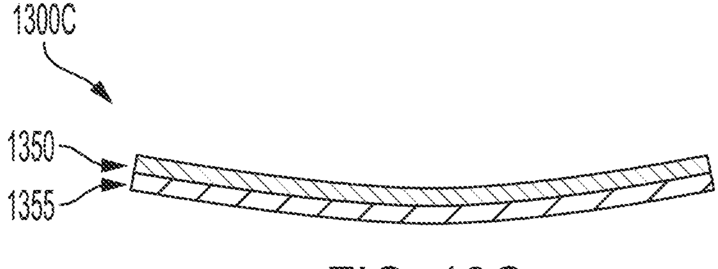

As discussed above, the variable CTE of polymers, e.g., between batches of polymers, can make it challenging to maintain the quality of the digital image presented to the user. The negative performance due to normal variations in CTE may result from the bi-metallic phenomenon. As used herein, the bi-metallic phenomenon may refer to material deformation that results when two or more materials that have different CTEs are mounted or otherwise joined together and undergo temperature changes together. FIGS. 13A-13C illustrate examples of the bi-metallic phenomenon. As shown in FIG. 13A, a component 1300A is includes two layers, where each layer is formed from different materials having a different CTE. For example, layer 1350 may be formed from brass while layer 1355 may be formed from steel. As shown in the figure, when the component is at a reference temperature, the first and second layers may be flat. As used herein, the reference temperature may refer to a temperature where both materials are undeformed.

FIG. 13B illustrates the component 1300B when heat is applied. Due to the difference in CTEs between the two layers, one material may expand more than the other, which results in displacement or curvature of the component. As seen in the figure, the brass 1350 may expand more than the steel 1355, which results in the convex curvature of the component 1300. FIG. 13C illustrates the component 1300B when it is cooled (compared to the reference temperature). As seen in the figure, the steel 1355 may expand more than the brass 1350, which may result in the concave curvature of the component 1300C.

The bi-metallic phenomena can apply to polymer lenses where differences in CTE may cause layers of the eyepiece to expand at different rates and separate, which may negatively impact the performance of the eyepiece. For example, the eyepiece performance and quality of the digital image can depend on maintaining a consistent distance or gap between the layers and alignment, e.g., top-down, of the layers within the stack. Variation in the CTE between the layers may affect the gap and alignment of the layers.

Figure 14:
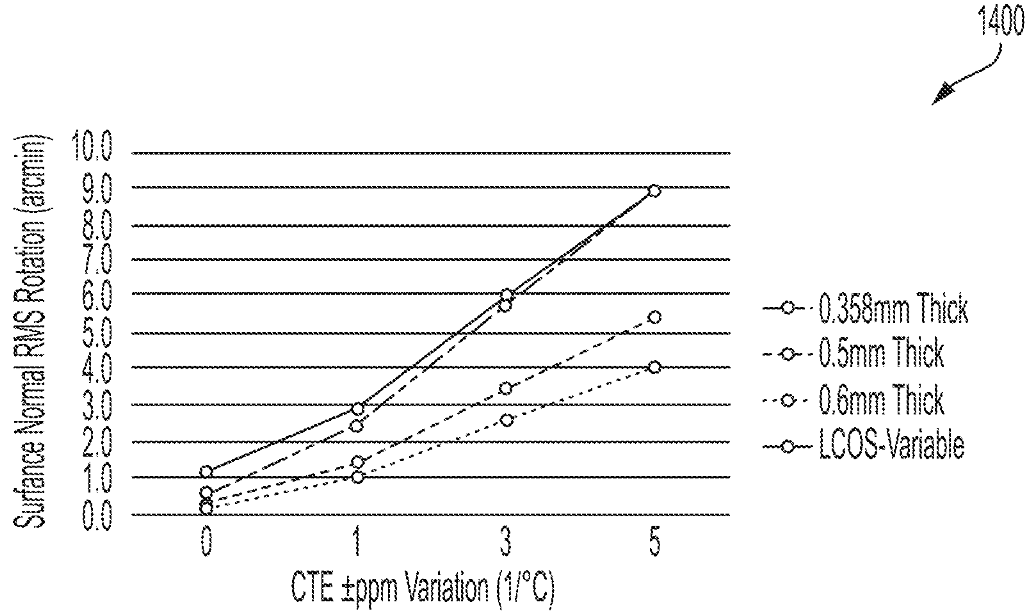
FIG. 14 is a chart that illustrates example performance degradation based on an increasing layer-to-layer CTE variation, according to one or more embodiments of the disclosure.

For example, different batches of polymer may have a variation in CTE of +5 ppm. The variation in CTE may result in degradation of the eyepiece performance. FIG. 14 illustrates a chart 1400 that demonstrates the impact in the variation in the CTE on performance degradation, where performance degradation correspond to the surface normal RMS rotation. Acceptable performance may correspond to a surface normal root mean square (RMS) rotation of one arcmin or less. As shown in the figure, surface normal RMS rotation increases with increases in CTE and variations of +1 ppm may correspond to an increase of about one arcmin or more. Thus, normal variations in CTE between polymer batches can have a negative impact on the performance of the eyepiece and the quality of the image produced. Embodiments according to this disclosure may provide eyepieces that are less susceptible to the bi-metallic phenomena.

Figure 15:
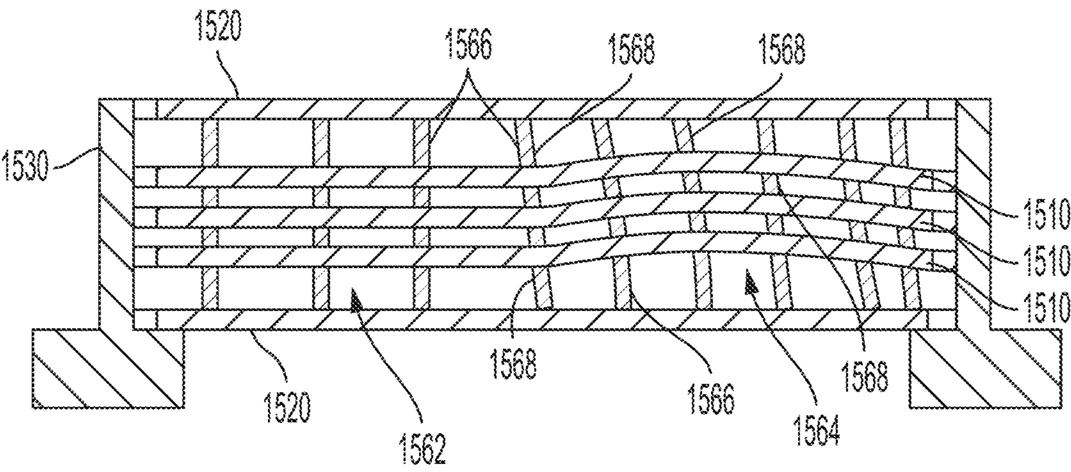
FIG. 15 illustrates an example eyepiece for an example mixed reality system, according to one or more embodiments of the disclosure.

FIG. 15 illustrates an example eyepiece 1500 in accordance with embodiments of the present disclosure. The eyepiece 1500 may include two glass cover layers 1520 that sandwich one or more polymer active layers 1510. As shown in the figure, the two glass cover layers 1520 may be substantially flat, while the polymer layers 1510 may include a flat region 1562 (e.g., corresponding to the region where the active layers 1510 are substantially flat) and a spherical region 1564 (e.g., corresponding to the region where the active layers are curved). As discussed above, a plurality of pillars may be located between the various layers to maintain a consistent spacing between each of the layers. For example, the eyepiece 1500 may include a plurality of variable height pillars 1566 disposed between the glass cover layer 1520 and the polymer active layers 1510. In this manner, the variable height pillars 1566 may maintain the spacing between flat glass cover layer 1520 and the polymer active layer 1510. The eyepiece 1500 may further include a plurality of uniform height pillars 1568 located between the polymer active layers 1510. The uniform height pillars 1568 may be provided to maintain a consistent gap between the polymer active layers. In some embodiments, the plurality of variable height pillars 1566 and the plurality of uniform height pillars 1568 may be formed integrally with an adjacent polymer active layer. While eyepiece 1500 is shown having the variable height pillars 1566 and uniform height pillars 1568 aligned, in some embodiments, the variable height pillars 1566 and uniform height pillars 1568 may not be aligned.

Figure 16:
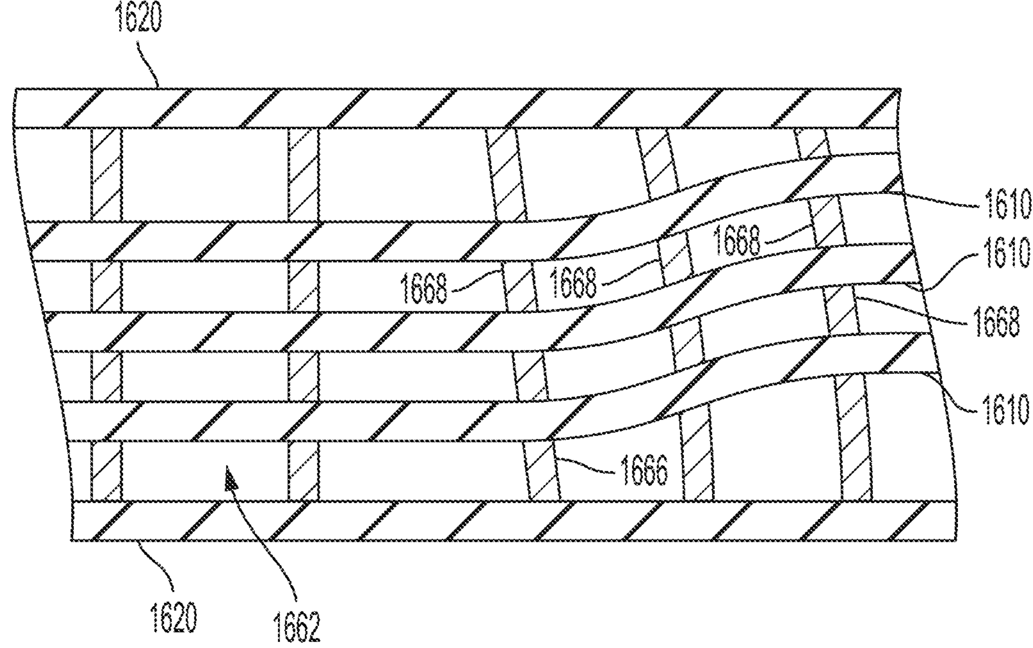
FIG. 16 illustrates an example eyepiece for an example mixed reality system, according to one or more embodiments of the disclosure.

FIG. 16 illustrates a detailed view of eyepiece 1600 for a mixed reality system according to embodiments of this disclosure. As shown in the figure, the eyepiece 1600 may include one or more layers and a plurality of spacers, e.g., pillars. For example, the eyepiece 1600 may include glass cover layers 1620 that sandwich a one or more polymer active layers 1610. The variable height pillars 1666 may span the distance between the flat glass layer 1620 and the polymer layer 1610. In some embodiments, the polymer layer 1610 may include a flat region 1662 and a spherical region 1664. In some embodiments the variable height pillars 1666 may be configured to slide along the glass layer 1620 as the adjacent polymer layer 1610 expands. In some embodiments, the variable height pillars 1666 may be formed integrally with an adjacent polymer layer 1610, such that the variable height pillars 1666 may move and/or slide along a glass cover layer 1620 based on the expansion of the polymer layer 1610. Due to the differences in CTEs between the glass and polymer, the glass layers 1620 may be mounted to the frame 1630 separately from the polymer active layers 1610 as described with respect to FIG. 12.

Forming an eyepiece, e.g., eyepiece 1500 and/or 1600, with one or more glass cover layers instead of polymer cover layers may leverage the relative stiffness of glass compared to polymer to maintain the shape of the active layers as the eyepiece heats up. For example, due to the relatively low CTE of glass, the glass cover layers may retain its shape and/or stay consistently shaped across the operating temperatures of the head mounted display, even as the display heats up. Moreover, deformation and/or separation of the polymer active layers 1610 may be limited because the polymer layers 1610 are sandwiched between the relatively stiff glass cover layers 1620. That is, the glass cover layers 1620 may be able to resist the deformation of the polymer layers 1610 located therein. Further, the glass cover layers 1620 may be relatively cost effective, as they do not require expensive manufacturing steps associated with forming glass active layers. Additionally, a durable surface finish may be achieved on glass cover layers compared to glass active layers, which may provide a more robust eyepiece. The surface finish may include, but not be limited to Gorilla Glass. In some examples, embodiments in accordance with eyepiece 1500 and/or 1600 may improve performance of an eyepiece that has not been athermalized by up to 90%.

Figure 17:
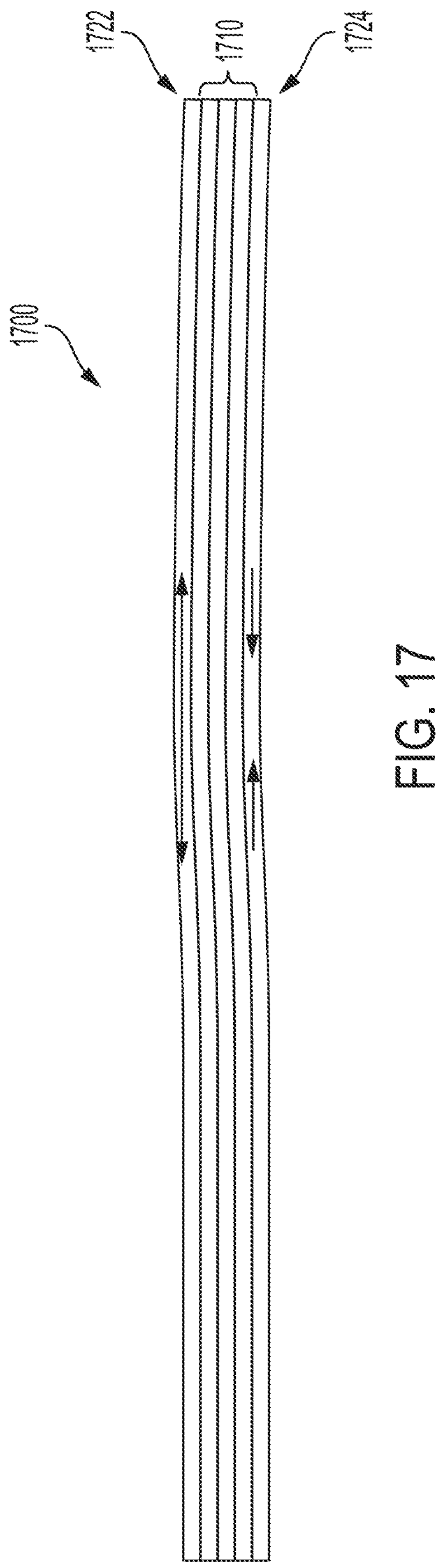
FIG. 17 illustrates an example eyepiece for an example mixed reality system, according to one or more embodiments of the disclosure.

FIG. 17 illustrates an eyepiece 1700 according to embodiments of this disclosure. As shown in the figure, the eyepiece may include a plurality of layers, including one or more cover layers 1722, 1724 and one or more active layers 1710. Embodiments in accordance with example may leverage the bi-metallic phenomenon to “tune” the top and bottom cover layers such that the eyepiece may be deformed as a unit. In other words, the top cover layer 1722 may be pre-selected to have a relatively high CTE and the bottom cover layer 1724 may be pre-selected to have a relatively low CTE, compared to the CTE of the active layers 1710. For example, if the active layers 1710 have a CTE variability of +5 ppm, the cover layers may vary by +10 ppm or +20 ppm. In this manner, behavior of the cover layers of the eyepiece is known—as the eyepiece temperature increases, the top cover layer 1722 may expand while the bottom cover layer 1724 may contract such that the eyepiece 1700 may resemble component 1300B when it heats up. That is, the eyepiece 1700 may deform to a bowed shape above its reference temperature. As the temperature of the eyepiece 1700 increases, each of the active layers 1710 may also expand based on their respective CTE, but the overall shape of the active layers may be tuned to conform to the shape determined by the CTE of the cover layers 1722, 1724.

Figure 18:
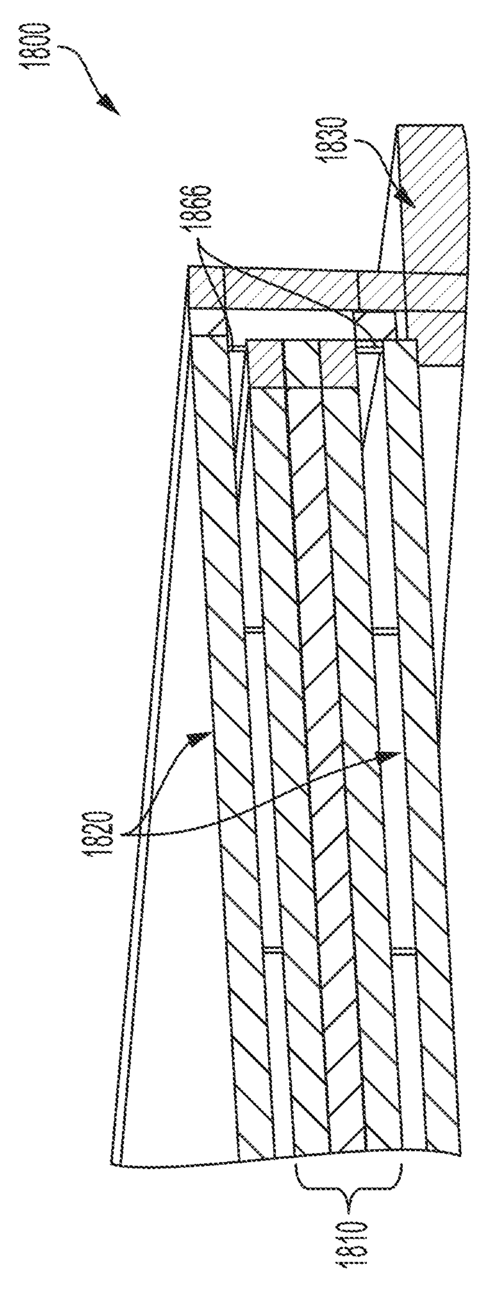
FIG. 18 illustrates an example eyepiece for an example mixed reality system, according to one or more embodiments of the disclosure.

FIG. 18 illustrates an eyepiece 1800 for a mixed reality device according to embodiments of this disclosure. The figure shows eyepiece 1800 before it is assembled. The pre-assembled eyepiece 1800 may include one or more substantially flat glass cover layers 1820 that sandwich one or more substantially flat polymer active layers 1810. The eyepiece 1800 may further include a plurality of variable height pillars 1866 disposed between the glass cover layers 1820 and adjacent polymer layers 1810. In some embodiments, a plurality of uniform height pillars (not shown) may be disposed between adjacent polymer layers 1810, as described above with respect to eyepiece 1500. Eyepiece 1800 may be configured to have a flat shape prior to assembly and a second different shape after being assembled. In some embodiments, one or more active layers may be deformed during assembly.

Figure 19:
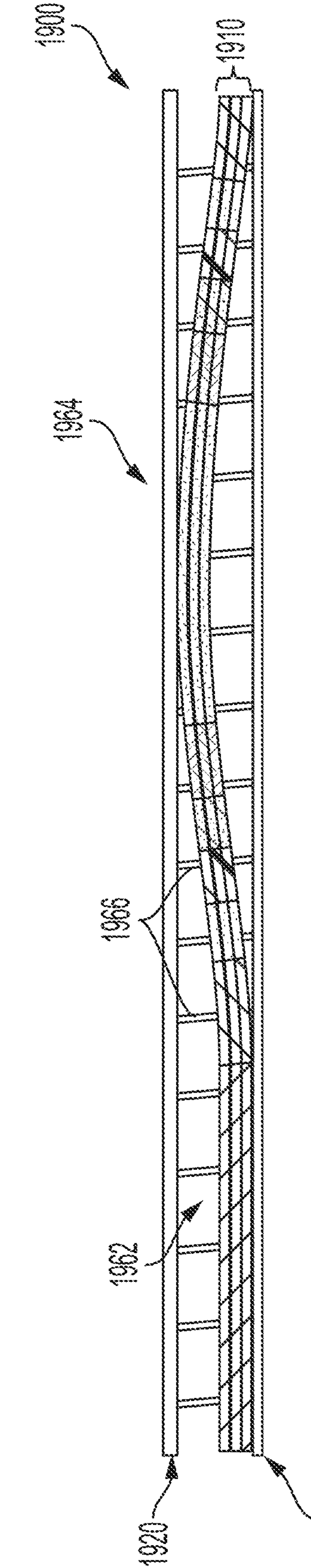
FIG. 19 illustrates an example eyepiece for an example mixed reality system, according to one or more embodiments of the disclosure.

FIG. 19 illustrates assembled eyepiece 1900, which may correspond to eyepiece 1800 after assembly. As seen in the figure, the assembled eyepiece 1900 may include a flat region 1962 and a spherical region 1964. In some embodiments, the variable height pillars 1966 may be sized such that once the eyepiece is assembled, the variable height pillars 1966 may engage the glass cover layers 1920 such that the assembled shape of the polymer active layers 1920 includes a flat portion 1962 and a spherical portion 1964. In other words, the process of assembling the eyepiece 1800 may deform the substantially flat polymer active layers to arrive at the eyepiece shape demonstrated by eyepiece 1900 that includes a flat portion and a spherical portion. While the shape of eyepiece 1900 may be exaggerated to illustrate the flat portion and the spherical portion, i.e., deflection of the spherical portion may not be as pronounced in practice, a skilled artisan will understand that an eyepiece in accordance with embodiments of this disclosure may include a flat region and a spherical portion. In some embodiments, the configuration of the assembled eyepiece 1900 may be similar to eyepieces 1200, 1500, and 1600.

In this manner, assembled eyepiece 1900 may have the advantages associated with eyepieces 1500 and 1600, namely, for example, the one or more glass cover layers may help maintain the shape of the active layers 1910 as the eyepiece expands with increases in temperature. For example, due to the relatively low CTE of glass, the glass cover layers may retain its shape and/or stay consistently shaped across the operating temperatures of the head mounted display, even as the display heats up. Additionally, deformation and separation of the polymer layers 1910 may be limited because the polymer layers 1910 are sandwiched between the relatively stiff glass cover layers 1920.

Moreover, deforming the active layers 1910 during assembly of the eyepiece 1900 to form the desired shape, e.g., having a flat region 1962 and a spherical region 1964, may pre-tension the polymer active layers 1910. The pre-tensioned polymer active layers 1910 may be less likely to separate with thermal expansion compared to, for example, a stack of polymer active layers that are not pre-tensioned, e.g., where the polymer active layers are molded to include flat region 1962 and spherical region 1964. Further, because the pre-assembled stack of active layers 1810 are flat, the manufacturing process for the active layers 1810 may be simplified. For example, the active layers 1810 can be manufactured as flat layers and rely on the variable height pillars to pre-tension the eyepiece into the desired shape during assembly. In comparison, active layers 1510 and/or 1610 may be manufactured to include a flat region and spherical region, which may add complexity to the manufacturing process.

Figure 20:
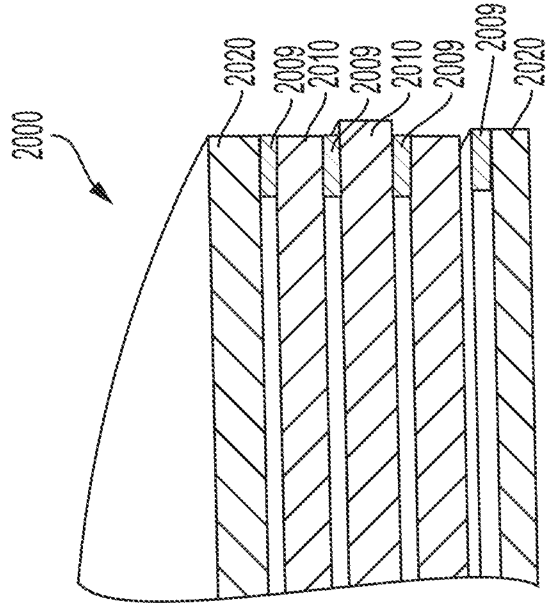
FIG. 20 illustrates an example eyepiece for an example mixed reality system, according to one or more embodiments of the disclosure.

FIG. 20 illustrates a perspective view of an eyepiece 2000 according to embodiments of this disclosure. As shown in the figure, the eyepiece may include a plurality of layers including one or more cover layers 2020 and one or more active layers 2010. The active layers 2010 and the cover layers 2020 may be configured to slide relative to each other. For example, as discussed above, an edge spacer 2009 may be located between each of the layers at the perimeter of each layer of the eyepiece. In some embodiments, the edge spacer may be coupled to one of the eyepieces. Coupling an edge spacer to one, not both of the adjacent eyepiece layers may permit the eyepiece layers to move and/or slide relative to each other. In comparison, as described above with respect to eyepiece 600, the edge spacers 609 can be sandwiched by and coupled to both adjacent eyepiece layers, which can prevent relative sliding of the eyepiece layers with respect to each other. For example, edge spacer **2009*a* may be located between bottom cover layer 2020 and active layer 2010. As shown in the figure, the edge spacer 2009*a* may be coupled to the bottom cover layer 2020 such that the active layer 2010 can slide with respect to the top cover layer 2020**.

Allowing the eyepiece layers to slide relative to each other may reduce separation of the eyepiece layers caused by the bi-metallic phenomenon. In other words, the eyepiece layers may not experience deformation associated with the bi-metallic phenomenon because the eyepiece layers are permitted to slide relative to each other. Accordingly, eyepieces according to embodiments of this disclosure that include layers that are permitted to slide relative to each other may improve the performance of the eyepiece, e.g., from a baseline design that does not account for thermal expansion effects.

In some embodiments, the relative sliding of the eyepiece layers may impact the optical alignment between the layers. For example, relative sliding of the eyepiece layers may cause misalignment between the light input region and a light source and/or between the light input regions and light output regions of the layers in the eyepiece. Some embodiments according to this disclosure may provide eyepieces with sliding layers that can maintain acceptable optical alignment between each of the layers during use. In one or more examples, acceptable optical alignment can be predetermined based on specific design considerations associated with the eyepiece. Additionally, some embodiments according to this disclosure may provide an eyepiece that includes sliding layers that may be assembled as a unit and resist damage and out of plane deformation and/or movement as the head mounted display experiences dynamic events, e.g., is dropped.

Figure 21:
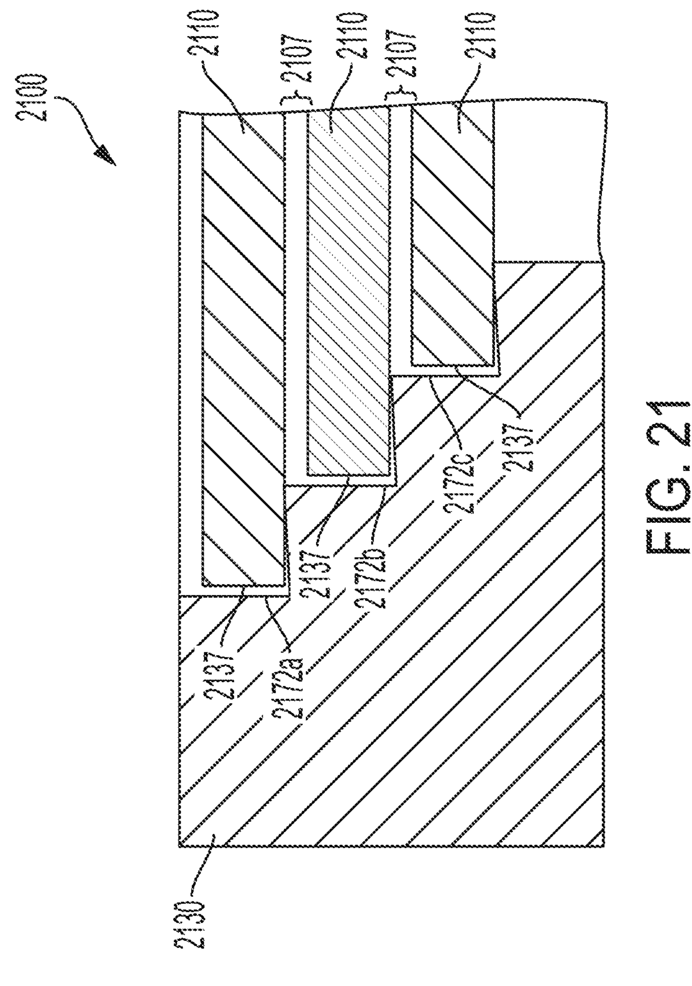
FIG. 21 illustrates an example eyepiece for an example mixed reality system, according to one or more embodiments of the disclosure.

FIG. 21 illustrates an eyepiece 2100 according to embodiments of the present disclosure. As shown in the figure, the eyepiece 2100 may include one or more eyepiece layers 2110 mounted to a frame 2130. The frame 2130 may include one or more steps **2172*a-c*, such that each step corresponds to an eyepiece layer 2110. In some embodiments, each of the eyepiece layers 2110 may be a different size that corresponds to a perimeter of the frame at each of the steps 2172. For example, as seen in the figure, the top step 2172*a* of the frame may have a larger perimeter than the bottom step 2172*c* of the frame. Accordingly, the top eyepiece layer 2110 may be larger than the bottom eyepiece layer 2110 to accommodate the larger perimeter of top step 2172*a***.

The one or more eyepiece layers 2110 may be configured to slide relative to each other as described above with respect to eyepiece 2000. For example, each eyepiece layer 2110 may be bonded with bond 2137 to a respective step 2172. The eyepiece layers 2110 may not be bonded to each other. In this manner, as the eyepiece 2100 under goes changes in temperature, the eyepiece layers 2110 may be permitted to slide relative to each other. In some embodiments, the bond 2137 may be located along discrete portions of the eyepiece layer 2110. In other words, the bond 2137 may not be located around an entire perimeter of the eyepiece layer 2110 and the frame 2130. In some embodiments, the configuration of the bonds 2137 may correspond to the configuration of bonds 831, and 833 as described with respect to eyepiece 800. That is, at least one set of bonds may be located near a light input region of the eyepiece. The bonds 2137 between the eyepiece layers 2110 and the frame 2130 may help the eyepiece retain optical alignment as the layers 2110 slide relative to each other. Moreover, because each of the eyepiece layers 2110 are bonded to the frame 2130, the eyepiece may be resistant to damage if the head mounted display is dropped or experiences a dynamic force.

In some embodiments, the steps 2172 may be manufactured to provide a consistent gap between each of the eyepiece layers 2110. The gap may be sized to permit expansion of the each of the eyepiece layers 2110, while maintaining a consistent gap 2107 between the layers. In some embodiments, a plurality of spacers may further be included to maintain the gap between the layers (e.g., spacers 609, 611).

Figure 22:
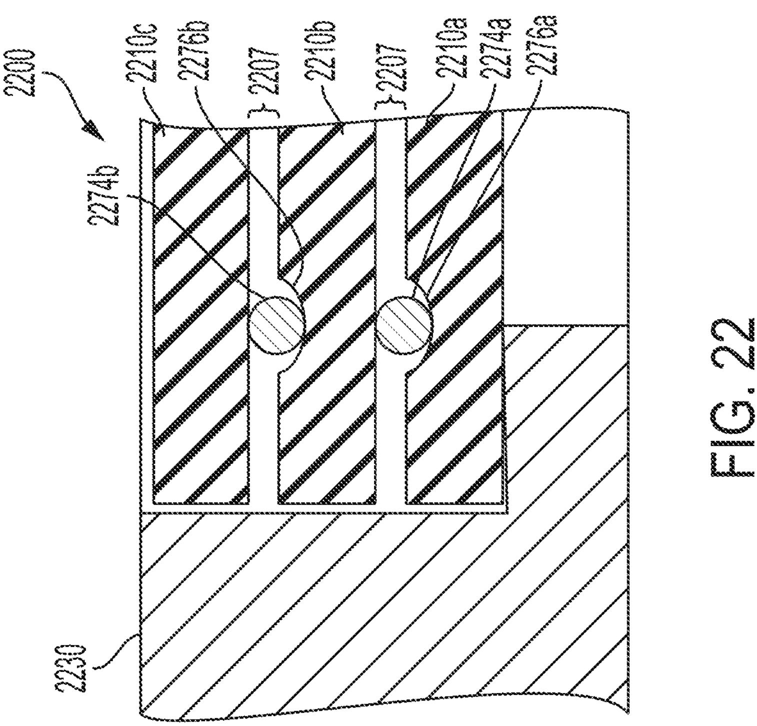
FIG. 22 illustrates an example eyepiece for an example mixed reality system, according to one or more embodiments of the disclosure.

FIG. 22 illustrates an eyepiece 2200 according to embodiments of the present disclosure. As seen in the figure, the eyepiece 2200 can include a plurality of eyepiece layers 2210, with one or more rollers 2274 located between each of the plurality of eyepiece layers 2210. In some embodiments, the rollers 2274 may be positioned near a perimeter of the eyepiece 2210. the rollers may facilitate relative sliding between the eyepiece layers 2210. The eyepiece layers 2210 may include active and/or cover layers.

In some embodiments, one or more of the eyepiece layers 2210 may be formed to include a slot 2276 that is configured to receive a roller 2274. The slot 2276 may prevent migration of the roller 2274 away from a desired location, e.g., near a perimeter of the eyepiece, which could negatively impact the performance and stability of the eyepiece 2210. In some embodiments, the slot 2276 may be molded as a feature of the eyepiece layer 2210. The capability to mold unique geometries is one of the benefits of polymer layers compared to glass layers. For example, a roller **2274*a* may be disposed in a slot 2276*a* molded into a top surface of an eyepiece layer 2210*a*. In this manner, the roller 2274*a* may be confined to the slot 2276*a*, while permitting relative sliding of an upper eyepiece layer 2210*b* over time. In addition to permitting sliding between the layers, the rollers 2274 may act as spacers and aid in maintaining consistent spacing between the eyepiece layers 2210. The rollers 2274** may be made from various materials, for example glass beads. In some embodiments, the rollers may be formed from a material with a relatively low CTE.

Figure 23:
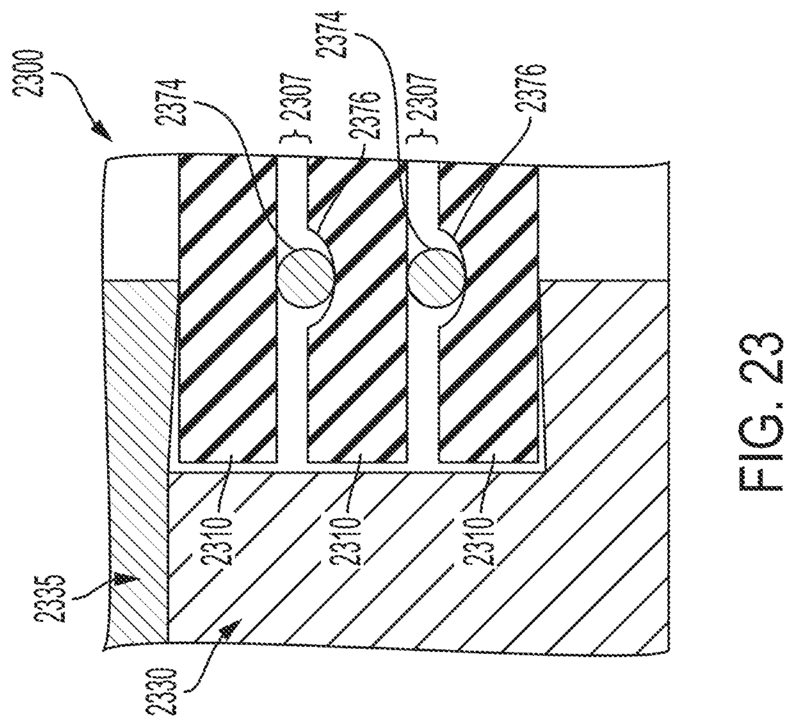
FIG. 23 illustrates an example eyepiece for an example mixed reality system, according to one or more embodiments of the disclosure.

FIG. 23 illustrates an optical system including an eyepiece 2300 and a frame 2330 according to embodiments of this disclosure. The eyepiece 2300 may be similar to the eyepiece 2200. That is, the eyepiece may include a plurality of eyepiece layers 2310 where one or more of the eyepiece layers 2310 include a plurality of slots 2276. As shown in the figure, a roller 2374 may be disposed in a corresponding slot 2376 to facilitate relative sliding between the plurality of eyepiece layers 2310. Additionally, the optical system may include a frame 2330 that includes a cap 2335. The cap 2335 may be provided to prevent deflections of the eyepiece 2300 in an out of plane direction normal to a surface of the eyepiece. In this manner, the optical system including eyepiece 2300 and frame 2330 may be more robust with the inclusion of cap 2335, as the optical system may be able to resist routine loading on the head mounted display resulting from routine use. The configuration of the cap 2335 may be similar to the lip 1035 and 1135. In some embodiments, the cap 2335 may include a layer of foam (not shown) similar to the layer of foam 1139 included in frame 1130.

Figure 24:
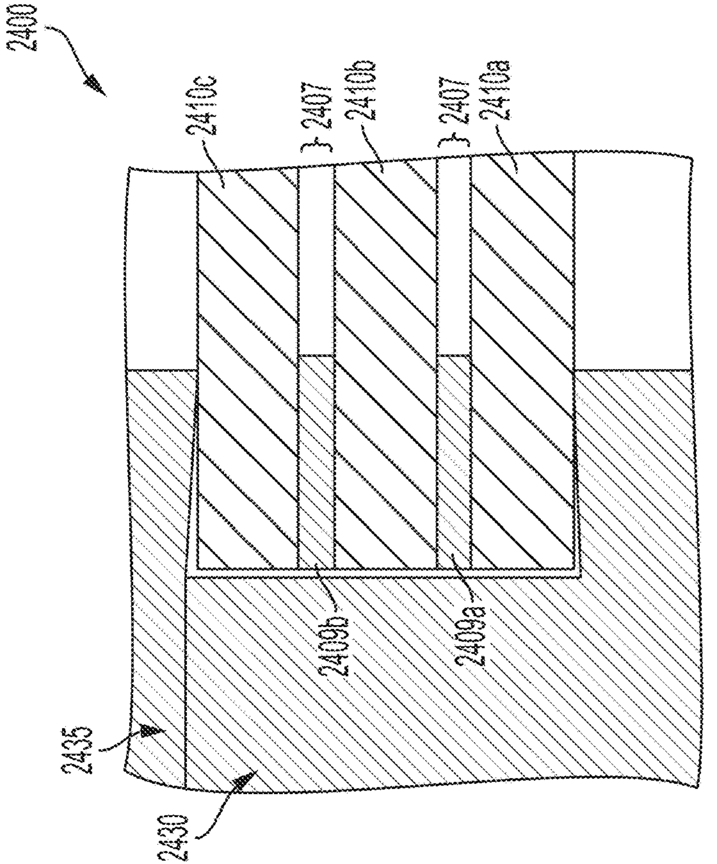
FIG. 24 illustrates an example eyepiece for an example mixed reality system, according to one or more embodiments of the disclosure.

FIG. 24 illustrates an eyepiece 2400 according to embodiments of this disclosure. The eyepiece 2400 may include one or more edge spacers **2409*a*, 2409*b* that can be formed integrally with a corresponding eyepiece layer. In this manner, the edge spacers, e.g., edge spacer 2409*a*, may be formed integrally with a corresponding eyepiece layer, e.g., eyepiece layer 2410*a*, and move with the corresponding eyepiece layer. In some embodiments a layer of lubricant or other material that reduces friction may be applied between an edge spacer 2409 and the adjacent non-coupled and/or non-integrated eyepiece layer. For example, in some embodiments, a layer of lubricant may be applied between edge spacer 2409*a* and adjacent eyepiece layer 2410*b***. In this manner, the lubricant may encourage sliding between the eyepiece layers.

Figure 25:
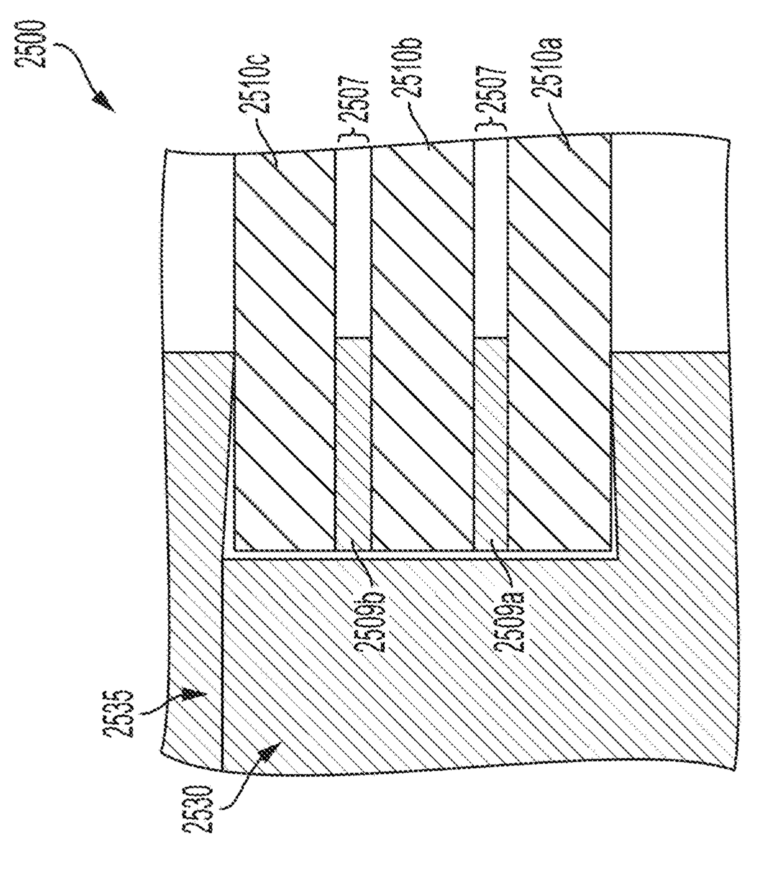
FIG. 25 illustrates an example eyepiece for an example mixed reality system, according to one or more embodiments of the disclosure.

FIG. 25 illustrates an eyepiece 2500 according to embodiments of this disclosure. As shown in the Figure, the eyepiece 2500 may include one or more eyepiece layers 2510 and one or more edge spacers **2509*a*, 2509*b* disposed between each of the one or more eyepiece layers 2510. In some embodiments, the edge spacer 2509*s* 2509*a*, 2509*b* may be formed separately and from a different material than the eyepiece layers. The edge spacers 2509*a*, 2509*b* may be coupled to one of the adjacent eyepiece layers. For example, as shown in the figure, edge spacer 2509*a* may be coupled to an adjacent eyepiece layer 2510*a*. In this manner, edge spacer 2509*a* and 2510*a* may be permitted to slide relative to eyepiece layer 2510*b*. In some embodiments, the edge spacer material may be selected to have a low coefficient of friction in order to promote sliding between an edge spacer, e.g., edge spacer 2509*a*, and an adjacent non-coupled eyepiece layer, e.g., eyepiece layer 2510*b***.

In some embodiments, the eyepiece, e.g., eyepieces illustrated in FIGS. 15-25, may be assembled at or near the steady state operating temperature of the head mounted display. The previous embodiments are generally described under the assumption that the eyepieces are assembled and/or manufactured at a reference temperature corresponding to a temperature of the eyepiece when the head mounted display is not in use. As the head mounted display is used, the display and eyepiece may increase in temperature as electronic components heat up with use. The head mounted display and eyepiece may eventually reach a "steady state" operating temperature, where the head mounted display no longer increases in temperature. Assembling the eyepiece at room temperature may result in the eyepiece providing peak performance and/or digital image quality at room temperature. As the head mounted display and eyepiece heat up and reach the steady state operating temperature, the image quality of the optical system may be negatively impacted. Assembling the eyepiece at or near steady state operating temperatures may provide optimal image quality and performance when the head mounted display is at the steady state operating temperature. This embodiment may result in improved optical performance of the head mounted display as it heats up, such that the head mounted display has peak performance at the steady state temperature. As a result, the image quality when the device starts up may be poorer than the image quality when the device is operating at a steady state temperature.

Embodiments of this disclosure provides systems and methods for displays. In some embodiments, a display system includes a frame, an eyepiece coupled to the frame, and a first adhesive bond disposed between the frame and the eyepiece. The eyepiece can include a light input region and a light output region. The first adhesive bond can be disposed along a first portion of a perimeter of the eyepiece, where the first portion of the perimeter of the eyepiece borders the light input region such that the first adhesive bond is configured to maintain a position of the light input region relative to the frame.

In some embodiments, the display may further include a second adhesive bond located between the frame and the eyepiece, where the second adhesive bond is located along a second portion of a perimeter of the eyepiece, where the second portion of the perimeter of the eyepiece borders the light output region, and where the second of adhesive bond is configured to permit lateral expansion of the eyepiece relative to the frame. In some embodiments, the display the first adhesive bond may be associated with a first elastic modulus and the second adhesive bond is associated with a second elastic modulus, wherein the first elastic modulus is greater than the second elastic modulus. In some embodiments, the display further includes a third adhesive bond, where the third adhesive bond is associated with the first elastic modulus and the first and third adhesive bond are disposed on opposite sides of the light input region. In some embodiments, a length of the first adhesive bond may be less than one half a length of the light input region. In some embodiments, the first adhesive bond may comprise an arcuate bond that is disposed proximate a perimeter of the light input region.

Embodiments of this disclosure provides systems and methods for eye pieces for a display. In some embodiments, an eyepiece may include a first eyepiece layer, a second eyepiece layer positioned substantially parallel to the first eyepiece layer, and one or more edge spacers disposed between the first eyepiece layer and the second eyepiece layer. The one or more edge spacers may be configured to maintain a consistent gap between the first eyepiece layer and the second eyepiece layer and permit relative sliding between the first eyepiece layer and the second eyepiece layer. In some embodiments, the one or more edge spacers of the eyepiece can be coupled to the first eyepiece layer. In some embodiments, the eyepiece may further include a layer of lubricant disposed between the one or more edge spacers and the second eyepiece layer. In some embodiments, integrally formed with the first eyepiece layer.

In some embodiments, the first eyepiece layer can be made from a first material, the one or more edge spacers can be made from a second material, different from the first material, where the second material may have a lower coefficient of friction relative to the first material. In some embodiments, a first surface of the first eyepiece layer comprises a slot, and wherein a corresponding edge spacer of the one or more edge spacers is disposed in the slot. In some embodiments, the eyepiece may further include a plurality of pillar spacers disposed between the first eyepiece layer and the second eyepiece layer, wherein the plurality of pillar spacers are configured to maintain a consistent spacing between the first eyepiece layer and the second eyepiece layer.

Embodiments of this disclosure provides systems and methods for a display. In some embodiments, the display can include a frame and an eyepiece coupled to the frame. The eyepiece can include a first eyepiece layer, a second eyepiece layer positioned substantially parallel to the first eyepiece layer, and one or more edge spacers disposed between the first eyepiece layer and the second eyepiece layer. The one or more edge spacers can be configured to maintain a consistent gap between the first eyepiece layer and the second eyepiece layer, and permit relative sliding between the first eyepiece layer and the second eyepiece layer. In some embodiments, the display the frame of the display may include a cap disposed along a perimeter of the frame. In some embodiments, the frame includes a first step corresponding to a first perimeter and a second step corresponding to a second perimeter. The first eyepiece layer is disposed in the first step along the first perimeter and the second eyepiece layer is disposed in the second step along the second perimeter. In some embodiments, one or more edge spacers can be integrally formed with the first eyepiece layer. In some embodiments, the display may further include a layer of lubricant disposed between the one or more edge spacers and the second eyepiece layer. In some embodiments, a first surface of the first eyepiece layer may include a slot, and a corresponding edge spacer of the one or more edge spacers can be disposed in the slot.

Embodiments of this disclosure provides systems and methods for a display. In some embodiments, the display can include a frame, wherein the frame comprises a first step corresponding to a first perimeter and a second step corresponding to a second perimeter. The display may further include an eyepiece disposed in the frame. The eyepiece may include at least a first eyepiece layer and a second eyepiece layer positioned substantially parallel to the first eyepiece layer, where the first eyepiece layer can be disposed in the first step along the first perimeter and the second eyepiece layer can be disposed in the second step along the second perimeter.

Although the disclosed examples have been fully described with reference to the accompanying drawings, it is to be noted that various changes and modifications will become apparent to those skilled in the art. For example, elements and/or components illustrated in the drawings may be not be to scale and/or may be emphasized for explanatory purposes. As another example, elements of one or more implementations may be combined, deleted, modified, or supplemented to form further implementations. For example, in some embodiments, eyepieces according to embodiments of this disclosure may include an eyepiece that combines the features of eyepiece 2100 and 2200, where an eyepiece may be mounted to a frame including a plurality of steps (e.g., eyepiece 2100 mounted in frame 2130). The eyepiece may further include a plurality of rollers (e.g., rollers 2276) disposed between the plurality of layers to maintain spacing of the eyepiece layers and facilitate relative sliding of the eyepiece layers. In some embodiments, a cap, e.g., cap 2335, may be included along portions of the frame to limit movement of the eyepiece layer in an out of plane direction. Other combinations and modifications are to be understood as being included within the scope of the disclosed examples as defined by the appended claims.

The invention claimed is:

1. A display comprising:

a frame;

an eyepiece coupled to the frame, wherein the eyepiece comprises:

a light input region; and a light output region; and a first adhesive bond disposed between the frame and the eyepiece, wherein the first adhesive bond is disposed along a first portion of a perimeter of the eyepiece, wherein the first portion of the perimeter of the eyepiece borders the light input region such that the first adhesive bond is configured to limit in-plane expansion or contraction of the eyepiece relative to the frame, wherein the frame further comprises a second adhesive bond disposed between the frame and the eyepiece, wherein the second adhesive bond is disposed along a second portion of a perimeter of the eyepiece, wherein the second portion of the perimeter of the eyepiece borders the light output region, and wherein the second adhesive bond is configured to permit in-plane expansion or contraction of the eyepiece relative to the frame.

2. The display of claim 1, wherein the first adhesive bond is associated with a first elastic modulus and the second adhesive bond is associated with a second elastic modulus, wherein the first elastic modulus is greater than the second elastic modulus.

3. The display of claim 2, further comprising a third adhesive bond, wherein the third adhesive bond is associated with the first elastic modulus and the first and third adhesive bond are disposed on opposite sides of the light input region.

4. The display of claim 3, wherein a length of the first adhesive bond is less than one half a length of the light input region.

5. The display of claim 1, wherein the first adhesive bond comprises an arcuate bond that is disposed proximate a perimeter of the light input region.

6. An eyepiece comprising:

a first eyepiece layer;

a second eyepiece layer positioned substantially parallel to the first eyepiece layer; and a plurality of spacers disposed between the first eyepiece layer and the second eyepiece layer, the plurality of spacers comprising an edge spacer and a pillar spacer, wherein the plurality of spacers is configured to:

maintain a consistent gap between the first eyepiece layer and the second eyepiece layer, and permit relative sliding between the first eyepiece layer and the second eyepiece layer.

7. The eyepiece of claim 6, wherein one or more of the plurality of spacers are coupled to the first eyepiece layer.

8. The eyepiece of claim 6, further comprising a layer of lubricant disposed between the plurality of spacers and the second eyepiece layer.

9. The eyepiece of claim 6, wherein one or more of the plurality of spacers are integrally formed with the first eyepiece layer.

10. The eyepiece of claim 6, wherein:

the first eyepiece layer comprises a first material, the plurality of spacers comprises a second material, different from the first material, and the second material has a lower coefficient of friction relative to the first material.

11. The eyepiece of claim 6, wherein a first surface of the first eyepiece layer comprises a slot, and wherein a corresponding spacer of the plurality of spacers is disposed in the slot.

12. A display comprising:

a frame; and an eyepiece coupled to the frame, wherein the eyepiece comprises:

a first eyepiece layer;

a second eyepiece layer positioned substantially parallel to the first eyepiece layer; and a plurality of spacers disposed between the first eyepiece layer and the second eyepiece layer, the plurality of spacers comprising an edge spacer and a pillar spacer, wherein the plurality of spacers is configured to:

maintain a consistent gap between the first eyepiece layer and the second eyepiece layer, and permit relative sliding between the first eyepiece layer and the second eyepiece layer.

13. The display of claim 12, wherein the frame comprises a cap disposed along a perimeter of the frame, the cap configured to limit deflections of the eyepiece in a direction normal to a surface of the eyepiece.

14. The display of claim 13, wherein the cap comprises a foam layer.

15. The display of claim 12, wherein the frame comprises:

a first step corresponding to a first perimeter; and a second step corresponding to a second perimeter, wherein the first eyepiece layer is disposed in the first step along the first perimeter and the second eyepiece layer is disposed in the second step along the second perimeter.

16. The display of claim 12, wherein one or more of the plurality of spacers are integrally formed with the first eyepiece layer.

17. The display of claim 12, further comprising a layer of lubricant disposed between the plurality of spacers and the second eyepiece layer.

18. The display of claim 12, wherein a first surface of the first eyepiece layer comprises a slot, and wherein a corresponding spacer of the plurality of spacers is disposed in the slot.

19. The display of claim 12, wherein further comprising a foam layer between the frame and the first eyepiece layer.

* * * * *